US008869126B2

(12) United States Patent
Guenthner et al.

(10) Patent No.: US 8,869,126 B2
(45) Date of Patent: *Oct. 21, 2014

(54) METHOD AND APPARATUS ENABLING MULTI THREADED PROGRAM EXECUTION FOR A COBOL PROGRAM INCLUDING OPENMP DIRECTIVES BY UTILIZING A TWO-STAGE COMPILATION PROCESS

(71) Applicants: Cynthia S. Guenthner, Glendale, AZ (US); Russell W. Guenthner, Glendale, AZ (US); John Edward Heath, Glendale, AZ (US); Albert Henry John Wigchert, Phoenix, AZ (US); F. Michel Brown, Glendale, AZ (US); Nicholas John Colasacco, New River, AZ (US); Clinton B. Eckard, McMinnville, TN (US)

(72) Inventors: Cynthia S. Guenthner, Glendale, AZ (US); Russell W. Guenthner, Glendale, AZ (US); John Edward Heath, Glendale, AZ (US); Albert Henry John Wigchert, Phoenix, AZ (US); F. Michel Brown, Glendale, AZ (US); Nicholas John Colasacco, New River, AZ (US); Clinton B. Eckard, McMinnville, TN (US)

(73) Assignee: Bull HN Information Systems Inc., Chelmsford, MA (US)

( * ) Notice: Subject to any disclaimer, the term of this patent is extended or adjusted under 35 U.S.C. 154(b) by 84 days.

This patent is subject to a terminal disclaimer.

(21) Appl. No.: 13/729,490

(22) Filed: Dec. 28, 2012

(65) Prior Publication Data

US 2014/0189663 A1 Jul. 3, 2014

Related U.S. Application Data

(63) Continuation of application No. 12/589,304, filed on Oct. 20, 2009, now Pat. No. 8,370,820.

(51) Int. Cl.
 *G06F 9/45* (2006.01)

(52) U.S. Cl.
 CPC .................................. *G06F 8/456* (2013.01)
 USPC .......................................... 717/149; 717/146

(58) Field of Classification Search
 CPC .......................................................... G06F 8/41
 USPC .................................... 717/140–144, 146–157
 See application file for complete search history.

(56) References Cited

U.S. PATENT DOCUMENTS

| 6,993,753 | B2 * | 1/2006 | Yamanaka et al. | 717/140 |
| 7,069,556 | B2 * | 6/2006 | Shah et al. | 718/102 |
| 8,370,820 | B2 * | 2/2013 | Guenthner et al. | 717/149 |

FOREIGN PATENT DOCUMENTS

WO    WO 0203194 A2 *  1/2002    ............... G06F 9/00

OTHER PUBLICATIONS

Mario Soukup, "A source-to-source openmp compiler", Aug. 2001, Thesis, Department of Electrical and Computer Engineering University of Toronto, pp. i-v, 1-81.*

* cited by examiner

*Primary Examiner* — Ted T Vo

(57) ABSTRACT

A method and apparatus is disclosed for compilation of an original Cobol program with support for improved performance by increased parallelism during execution using multiple threads of processing. The approach includes a two stage compilation process, the first compilation/translation step by a first specialized compiler/translator that takes as input a Cobol source program that includes parallelization directives, and produces as output an intermediate computer program in a second computer programming language, the intermediate program including parallelization directives in the second computer programming language. The intermediate program is then compiled utilizing a selected second compiler that provides support for parallelism described in the second programming language. The approach optionally allows for use of pragmas serving as parallelization directives to the compiler in the original Cobol program or in the intermediate program.

11 Claims, 20 Drawing Sheets

```
601  /* C code from PROCEDURE DIVISION generated by Cobol-IT compiler    */
602  /* from Example.COBOL program illustrated in FIG. 5                 */
603      cob_setswp_u32_binary (b_5, 1);
604  while (1)    {
605  if (((int)cob_cmpswp_u32_binary (b_5, 99) > 0))
606  break;
607      {       /* ExampleCBL:19: PERFORM *
608      cob_setswp_u32_binary (b_6, 1);
609  while (1)
610      {
611  if (((int)cob_cmpswp_u32_binary (b_6, 500) > 0))
612  break;
613      {       {
614          cob_decimal_set_uint (&d0, ((unsigned int)COB_BSWAP_32(*(int *)(b_5))));
615          cob_decimal_set_uint (&d1, ((unsigned int)COB_BSWAP_32(*(int *)(b_6))));
616          cob_decimal_add (&d0, &d1);
617          cob_decimal_get_field (&d0, (f0.size = 4, f0.data =
618  b_8 + 4 * (((unsigned int)COB_BSWAP_32(*(int *)(b_6))) - 1) +
619  2000 * (((unsigned int)COB_BSWAP_32(*(int *)(b_5))) - 1),
620  f0.attr = &a_1, &f0), 2);
621      }       }                                                    620
622  cob_addswp_u32_binary (b_6, 1);
623      }
624  }
625  cob_addswp_u32_binary (b_5, 1);
```

FIG. 6

Prior Art

```
701  * Example.COBOL further including OMP Style pragmas relating to a Cobol program
702  * for describing suggested regions of parallelization to the Special Compiler
703  * of the first stage
704  REPLACE NRA BY 99, NCB BY 500.
705  IDENTIFICATION DIVISION.
706  PROGRAM-ID.  ExampleCBL.
707  DATA DIVISION.
708  WORKING-STORAGE SECTION.
709      01 I-BUMP        PIC 9(6)  USAGE IS BINARY.
710      01 J-BUMP        PIC 9(6)  USAGE IS BINARY.
711      01 K-BUMP        PIC 9(6)  USAGE IS BINARY.
712      01 TABLE-C.
713         02 ROW-C1 OCCURS NRA TIMES.
714            03 POSITION-C1 OCCURS NCB TIMES.
715               05 CC COMP-11.
716  PROCEDURE DIVISION.
717  ExampleCBL-start.
718  *#OMP PRAGMA PARALLEL-BEGIN AAA.
719  *#OMP PRAGMA PERFORM-BEGIN AAA private( I-BUMP, J-BUMP).
720      PERFORM VARYING I-BUMP FROM 1 BY 1 UNTIL I-BUMP > NRA
721         PERFORM VARYING J-BUMP FROM 1 BY 1 UNTIL J-BUMP > NCB
722            COMPUTE CC (I-BUMP, J-BUMP) = I-BUMP + J-BUMP
723         END-PERFORM
724      END-PERFORM.
725  *#OMP PRAGMA PERFORM-END AAA.
726  *#OMP PRAGMA PARALLEL-END AAA.
727      DISPLAY "NRA        = " NRA.          DISPLAY "NCB        = " NCB.
728      DISPLAY "CC (1, 1)  = " CC (1, 1).    DISPLAY "CC (1, 2)  = " CC (1, 2).
729      DISPLAY "CC (NRA, NCB) = " CC (99, 500).
730      DISPLAY "<END test>".
731      STOP RUN.
732  END-PROGRAM.
```

```
801  int main () {      // C PROGRAM GENERATED BY SPECIAL COMPILER FROM COBOL IN FIG. 7
802      comp6 I_BUMP;
803      comp6 J_BUMP;
804      comp6 K_BUMP;
805      struct TABLE_TABLE_C {
806          struct TABLE_ROW_C1 {
807              struct TABLE_POSITION_C1 {
808                  float CC;
809              } POSITION_C1[500];
810          } ROW_C1[99];
811      } TABLE_C;
812  EXAMPLECBL_START:
813  #pragma omp parallel
814  {                                              // Parallel-Begin AA0
815  #pragma omp for private( I-BUMP, J-BUMP)       // Parallel-Perform AAA
816  for (I_BUMP = 1; I_BUMP < 100; I_BUMP++) {
817      for (J_BUMP = 1; J_BUMP < 501; J_BUMP++) {
818          TABLE_C.ROW_C1[I_BUMP-1].POSITION_C1[J_BUMP-1].CC=I_BUMP+J_BUMP;
819      };
820  }                                              // AAA
821  }                                              // Parallel-End AA0
822      printf ("NRA      = 99\n");
823      printf ("NCB      = 500\n");
824      printf ("CC (1, 1)     = %e\n", TABLE_C.ROW_C1[1-1].POSITION_C1[1-1].CC  );
825      printf ("CC (1, 2)     = %e\n", TABLE_C.ROW_C1[1-1].POSITION_C1[2-1].CC  );
826      printf ("CC (NRA, NCB) = %e\n", TABLE_C.ROW_C1[98].POSITION_C1[500-1].CC);
827      printf ("<END test>\n");
828      return(0);
829  }
```

```
901  * matrix3P.cbl
902  IDENTIFICATION DIVISION.
903  PROGRAM-ID.  matrix3P.
904  DATA DIVISION.
905  WORKING-STORAGE SECTION.
906  01 I-BUMP        PIC S9(6)  USAGE IS BINARY
907  01 J-BUMP        PIC S9(6)  USAGE IS BINARY
908
909  01 K-BUMP        PIC S9(6)  USAGE IS BINARY
910
911  01 TABLE-A.
912     02 ROW-A1 OCCURS 200 TIMES.
913        03 POSITION-A1 OCCURS 5000 TIMES.
914           05 AA COMP-1 .
915
916  01 TABLE-B.
917     02 ROW-B1 OCCURS 200 TIMES.
918        03 POSITION-B1 OCCURS 5000 TIMES.
919           05 BB COMP-1 .
920
921  01 TABLE-C.
922     02 ROW-C1 OCCURS 200 TIMES.
923        03 POSITION-C1 OCCURS 5000 TIMES.
924           05 CC COMP-1 .
```

FIG. 9A

```
925      PROCEDURE DIVISION.
926      matrixCBL-start.
927          DISPLAY "<Start>COBOL matrix array test".
928
929          PERFORM VARYING K-BUMP FROM 1 BY 1 UNTIL K-BUMP = 200
930      *#OMP PRAGMA PARALLEL REGION-BEGIN AA0.
931
932          * Build-table-A
933          *#OMP PRAGMA PARALLEL PERFORM-BEGIN AAA private( I-BUMP, J-BUMP).
934          PERFORM VARYING I-BUMP FROM 1 BY 1 UNTIL I-BUMP > 200
935              PERFORM VARYING J-BUMP FROM 1 BY 1 UNTIL J-BUMP > 5000
936                  COMPUTE AA (I-BUMP, J-BUMP) = I-BUMP + J-BUMP
937              END-PERFORM
938          END-PERFORM
939
940          * Build-table-B.
941          # OMP PRAGMA PARALLEL PERFORM-BEGIN BBB .
942          PERFORM VARYING I-BUMP FROM 1 BY 1 UNTIL I-BUMP > 200
943              PERFORM VARYING J-BUMP FROM 1 BY 1 UNTIL J-BUMP > 5000
944                  COMPUTE BB (I-BUMP, J-BUMP) = I-BUMP + J-BUMP
945              END-PERFORM
946          END-PERFORM
947
948          * Build-table-C.
949          # OMP PRAGMA PARALLEL PERFORM-BEGIN CCC .
950          PERFORM VARYING I-BUMP FROM 1 BY 1 UNTIL I-BUMP > 200
951              PERFORM VARYING J-BUMP FROM 1 BY 1 UNTIL J-BUMP > 5000
952                  COMPUTE CC (I-BUMP, J-BUMP) = ZERO
953              END-PERFORM
954          END-PERFORM
```

FIG. 9B

```
955  * Process-all-tables.
956  # OMP PRAGMA PARALLEL PERFORM-BEGIN PROCESS-ALL .
957  PERFORM VARYING I-BUMP FROM 1 BY 1 UNTIL I-BUMP > 200
958    PERFORM VARYING J-BUMP FROM 1 BY 1 UNTIL J-BUMP > 5000
959      COMPUTE CC (I-BUMP, J-BUMP) = AA(I-BUMP, J-BUMP) + BB(I-BUMP, J-BUMP)
960        + FUNCTION SIN(AA (I-BUMP, J-BUMP)) + FUNCTION COS(BB (I-BUMP, J-BUMP))
961    END-PERFORM
962  END-PERFORM.
963  END-PERFORM.
964
965  DISPLAY "CC (200, 5000) = " CC (199, 4999).
966
967  DISPLAY "<END>COBOL matrix array test.".
968
969  STOP RUN.
970  END-PROGRAM.
```

FIG. 9C

```
1001  // * matrix3P.cbl
1002  int main () {
1003
1004  comp6 I_BUMP;
1005  comp6 J_BUMP;
1006
1007  comp6 K_BUMP;
1008
1009  struct TABLE_TABLE_A {
1010    struct TABLE_ROW_A1 {
1011      struct TABLE_POSITION_A1 {
1012        float AA;
1013      } POSITION_A1[5000]; } ROW_A1[200]; } TABLE_A;
1014
1015  struct TABLE_TABLE_B {
1016    struct TABLE_ROW_B1 {
1017      struct TABLE_POSITION_B1 {
1018        float BB;
1019      } POSITION_B1[5000]; } ROW_B1[200]; } TABLE_B;
1020
1021  struct TABLE_TABLE_C {
1022    struct TABLE_ROW_C1 {
1023      struct TABLE_POSITION_C1 {
1024        float CC;
1025      } POSITION_C1[5000]; } ROW_C1[200]; } TABLE_C;
```

FIG. 10A

```
1026   MATRIXCBL_START:
1027      printf ("<Start>COBOL matrix array test\n");
1028      for (K_BUMP = 0; K_BUMP <200; K_BUMP++) {
1029         #pragma omp parallel
1030         {
1031
1032         // * Build-table-A
1033         #pragma omp parallel for private(I_BUMP, J_BUMP)
1034         for (I_BUMP = 1 ;I_BUMP<201 ;I_BUMP++) {
1035            for (J_BUMP = 1 ;J_BUMP<5001 ;J_BUMP++) {
1036               TABLE_A.ROW_A1[I_BUMP-1].POSITION_A1[J_BUMP-1].AA=I_BUMP+J_BUMP;
1037            };
1038         };
1039
1040         // * Build-table-B.
1041         #pragma omp for schedule (static)
1042         for (I_BUMP = 1 ;I_BUMP<201 ;I_BUMP++) {
1043            for (J_BUMP = 1 ;J_BUMP<5001 ;J_BUMP++) {
1044               TABLE_B.ROW_B1[I_BUMP-1].POSITION_B1[J_BUMP-1].BB=I_BUMP+J_BUMP;
1045            };
1046         };
1047
1048         // * Build-table-C.
1049         #pragma omp for schedule (static)
1050         for (I_BUMP = 1 ;I_BUMP<201 ;I_BUMP++) {
1051            for (J_BUMP = 1 ;J_BUMP<5001 ;J_BUMP++) {
1052               TABLE_C.ROW_C1[I_BUMP-1].POSITION_C1[J_BUMP-1].CC=ZERO;
1053            };
1054         };
```

FIG. 10B

```
1055    // * Process-all-tables.
1056
1057    #pragma omp for schedule (static)
1058    for (I_BUMP = 1 ;I_BUMP<201 ;I_BUMP++) {
1059       //  printf("Thread=%d did row=%d position=%d\n",tid,I_BUMP,J_BUMP);
1060       for (J_BUMP = 1 ;J_BUMP<5001 ;J_BUMP++) {
1061          TABLE_C.ROW_C1[I_BUMP-1].POSITION_C1[J_BUMP-1].CC =
1062             TABLE_A.ROW_A1[I_BUMP-1].POSITION_A1[J_BUMP-1]   .AA +
1063             TABLE_B.ROW_B1[I_BUMP-1].POSITION_B1[J_BUMP-1].BB +
1064             sin(TABLE_A.ROW_A1[I_BUMP-1].POSITION_A1[J_BUMP-1].AA) +
1065             cos(TABLE_B.ROW_B1[I_BUMP-1].POSITION_B1[J_BUMP-1].BB);
1066       };
1067    };
1068
1069    }; // end omp pragma parallel
1070
1071    };
1072
1073    printf ("CC (200, 5000) = %f\n","TABLE_C.ROW_C1[199].POSITION_C1[5000-1].CC  );
1074    printf ("<END>COBOL matrix array test.\n");
1075
1076    return(0);
1077
1078    } // end main
1079
```

FIG. 10C

```
1101    # Execution Time Report comparing 1 thread with 3 threads
1102    > gcc -I /usr/local/include -L/usr/local/lib -lcob matrix3P.c -o matrix3P1
1103    > gcc -I /usr/local/include -L/usr/local/lib -lcob matrix3P.c
1104                                                             -fopenmp -o matrix3P3
1105
1106    # Starting matrix3.c multiple example with 1 threads
1107    > time -p ./matrix3P1
1108    <Start>COBOL matrix array test
1109    CC (200, 5000) = 10398.595703
1110    <END>COBOL matrix array test.
1111
1112    real 26.04
1113    user 26.02
1114    sys  0.01
1115
1116
1117    # Starting matrix3.c multiple example with 3 threads
1118    > time -p ./matrix3P3
1119    <Start>COBOL matrix array test
1120    CC (200, 5000) = 10398.595703
1121    <END>COBOL matrix array test.
1122
1123    real 10.68
1124    user 32.00
1125    sys  0.01
1126
1127    >
```

Compiling with OpenMP enabled running 3 threads

Compiling without OpenMP ( for running single thread )

Actual Time in Seconds Running with 1 thread

Actual Time in Seconds Running with 3 threads

Overall Performance Ratio Comparison of 3 threads to 1 thread
= 26.04 seconds / 10.68 seconds = > 2.43

FIG. 11

METHOD AND APPARATUS ENABLING MULTI THREADED PROGRAM EXECUTION FOR A COBOL PROGRAM INCLUDING OPENMP DIRECTIVES BY UTILIZING A TWO-STAGE COMPILATION PROCESS

CROSS REFERENCE TO RELATED APPLICATIONS

Continuation of U.S. patent application Ser. No. 12/589,304 filed on Oct. 20, 2009
Reference U.S. Provisional Application No. 61/459,227 filed Dec. 9, 2010
Reference U.S. Application No. 61/459,227 filed Dec. 7, 2011

This Patent Application claims priority to and is a continuation of U.S. patent application Ser. No. 12/589,304 filed on Oct. 20, 2009, the disclosure of which is hereby incorporated herein by reference in full and in its entirety as part of this specification. All other referenced patents and applications are also incorporated herein by reference in their entirety. Furthermore, where a definition or use of a term in a reference, which is incorporated by reference herein, is inconsistent or contrary to the definition of that term provided herein, the definition of that term provided herein shall govern the meaning of such term.

STATEMENT REGARDING FEDERALLY SPONSORED RESEARCH OR DEVELOPMENT

None

THE NAMES OF PARTIES TO A JOINT RESEARCH AGREEMENT

None

INCORPORATION-BY-REFERENCE OF MATERIAL SUBMITTED ON A COMPACT DISC

None

BACKGROUND OF THE INVENTION

1. Field of the Invention

This invention is related to the fields of computing machines; parallel processing; parallel computing; multiple thread program execution; the computer language Cobol; the computer languages JAVA, C/C++ and Fortran; computer program compilers; computer languages, and other closely related computer art.

2. Description of the Related Art

In the field of computing machines and computing performance, computer users have become accustomed to computer performance increasing steadily over the years as a result of technological innovation in the hardware of computers. However, there are limits on technology which tend to limit continued increases in computer hardware performance. For example, certain technical limitations tend to limit how fast a computer program can run on a single computer.

An alternative to increasing performance of a program on a single or small number of processing units is to spread the work to be done across multiple processors or multiple computers. Innovation and technical advancement in this area have provided for increasing computer program performance by developing techniques for spreading work across a plurality of computers or central processing units. A common term for this spreading of work is "parallelization". There are many forms of parallelization and ways of achieving parallelization which are discussed at length in literature surrounding the art and which will not be discussed here. One particular area of research and significant development which is of particular interest in the field of parallelization is a standard for describing and enabling parallelization called OpenMP Architecture (Open Multi-Processing Architecture). "OpenMP" is a trademark of the OpenMP Architecture Review Board, and the standard is described on the Internet at a website"OpenMP.org" The OpenMP Architecture is described within this webpage as "API Specification for Parallel Programming". Wikipedia.org further describes OpenMP as:

"The OpenMP (Open Multi-Processing) is an application programming interface (API) that supports multi platform shared memory multiprocessing programming in C, C++ and Fortran on many architectures, including Unix and Microsoft Windows platforms. It consists of a set of compiler directives, library routines, and environment variables that influence run-time behavior.

Jointly defined by a group of major computer hardware and software vendors, OpenMP is a portable, scalable model that gives programmers a simple and flexible interface for developing parallel applications for platforms ranging from the desktop to the supercomputer.

An application built with the hybrid model of parallel programming can run on a computer cluster using both OpenMP and Message Passing Interface (MPI), or more transparently through the use of OpenMP extensions for non-shared memory systems."

OpenMP as a project was initiated in 1997 at a major conference on High Performance Computing Networking, and Storage held in San Jose, Calif. The conference was named "Supercomputing 1997". The proposal for a parallel programming "standard" grew out of a "birds of a feather" session to unveil new portable programming interfaces for shared memory parallel computers. Following the conference a company was set up to own and maintain the new informal standard and it was called the OpenMP Architectural Review Board (ARB).

The OpenMP architecture provides a methodology and programming language enhancements that enable processing with parallel threads of processing. OpenMP requires support within (or "by") a compiler, that is, it is not just a library that is called; it requires support by the compiler itself. OpenMP today is supported by several major compilers (GNU C compiler, Intel, Microsoft) for computer programs written in the languages of C/C++, and Fortran. There are books and classes on parallel programming based upon OpenMP.

However, OpenMP architectural support for programs written in other computer languages such as Cobol, Pascal and other either "older" or less common computer programming languages is not provided by major computer program compiler manufacturers such as Intel, Microsoft, or by providers of open source compilers such as GNU.org. As a result, the benefits of programming utilizing OpenMP to achieve parallelism are not currently available for programs written in these older languages, and support is not likely to be provided in the future by major compiler manufacturers because most new program development is done in more modern languages.

However, Cobol is still the programming language for many large computer business applications that are in production use today, and the performance of these programs or applications is often critical to operation of a business. Therefore, it would be beneficial if these large computer applications could be made to benefit from parallel programming in order to improve their performance during execution. Improvement in performance of what are commonly called "batch" programs might be especially important. The term "Batch" is used to describe a job, often run at night, that typically processes a large amount of data from a day of recorded transactions. Oftentimes "batch" programs are run at night and oftentimes must be completed before more transaction data can be accumulated (the next day for example).

Providing support for parallelization techniques by a compiler for a language such as Cobol is a very significant task for several reasons. First of all, developing a new compiler or significantly enhancing an existing compiler for any purpose can be a large task. Second, providing for parallelization enabling concepts within generated code from a compiler is a difficult job, and would be a very significant development task. Third, one major component of "good" compilers is providing a facility/mechanism/capability for carrying out very extensive optimization of generated code in order to achieve good performance during execution, and support for OpenMP would typically have impact on those optimizations. For these reasons and others such as lack of limited resources, innovation, financial burdens etc., major compiler builders have not provided a Cobol compiler that supports parallelism such as the OpenMP architecture.

Because of the business nature of most Cobol applications, existing Cobol compilers used by large businesses are very carefully maintained by vendors in providing for backwards compatibility and to avoid any possible introduction of bugs or flaws in the code generation process. The importance of producing correct calculations is emphasized and thus, even the smallest changes are typically verified carefully by running large numbers of test programs. As a result, changes and improvements to Cobol compilers are made slowly and carefully, possibly even reluctantly.

Another reason parallelization support has not been provided for the Cobol programming language is that the language of Cobol is not necessarily well suited to parallelization. The Cobol language, because it is quite "old", has typically been used to describe a program that exists statically in memory with static memory variables, and oftentimes without the use of "modern" programming constructs such as "stacks" or automatic memory allocation and de-allocation. This tends to create conflicts in the use of memory based variables when attempts are made to parallelize program execution, because parallelization typically requires at least some degree of isolation of memory between the units of parallelized code. Also, there are no OpenMP library facilities available which directly provide OpenMP support for the Cobol language.

But, improving the performance of programs written in Cobol is potentially important, and improving performance by providing for support of parallel processing in the execution of a Cobol program would result in a potentially significant increase in performance by enabling application and utilization of multiple processors or computing cores to a single program or problem which was normally run, in the prior art, as a single-thread process or procedure. The same is also true for other languages such as Pascal, PL/1, or other possibly "older" languages where no support for parallelism is currently provided by major compiler providers.

The state of the art has also evolved such that parallelization or multithreading of programs now has some increased potential for being automated, or at least done with more help by tools than in the past. One company that is exploring this area of research is a Swedish company called Nema Labs which is developing a tool called "FasThread". Nema Labs has a website at: "NemaLabs.com". From the company's website is the statement: "Nema Labs is a privately held company founded in 2006 with the mission to provide programmers with powerful and easy-to-use threading tools for multi-core platforms. The technology base originates on world-class research . . . "

Nema Labs provides a tool which attempts to semi-automate the parallelization of programs written in "C" and is currently working on a version of the tool which also supports "C++". The FasThread's analysis and processing tool includes a mechanism for inserting OpenMP pragmas into programs in the "C" language based upon analysis by the tool. This type of tool provides the potential of being useful in achieving parallelization. It utilizes OpenMP and is not applicable to a source program described in any language except its "native" input language of C.

A Cobol programmer may thus now be motivated to look at the potential for parallelization of certain, possibly large, Cobol programs, in spite of the possibility that parallelization of these programs may not have been feasible in the past.

BRIEF SUMMARY OF THE INVENTION

It would therefore be an advantage to provide a method and/or apparatus for compilation of a program written in a source computer language not normally supported for OpenMP, which enables parallelization during execution of the generated code (either object or executable). It is also an advantage to provide a method of compilation designed to eliminate need for development of a Cobol compiler with integrated parallelization support, and with the method further providing for minimal maintenance effort in the support of providing such a method and/or apparatus.

An illustrated embodiment of the present invention provides support for a method and apparatus for carrying out compilation of an original Cobol program which produces an executable program that supports multiple threads of processing, improving performance of the original Cobol program during execution.

The method according to an illustrated embodiment implements a two-step or two-phase approach in performing a compilation of an original Cobol program. In the illustrated embodiment, a first compiler or translator is utilized in a first phase of the two phase approach to analyze, process, and translate the original Cobol program source into an intermediate source form in a second computer programming language. This intermediate source produced in the first phase is in a form for describing a program in a manner suited for parallelization through the use of parallelization directives such as the type used by the OpenMP architecture. In a subsequent second phase of the two phase approach, a second selected compiler, which provides support for the parallelization of an input program described in that second computer language, is utilized to compile the intermediate source and produce as an output, a multithread executable program for running on multiple processors or computing cores.

More specifically, as described with reference to the illustrated embodiment, a first compiler translates in a special way a Cobol source program into an intermediate program. A second selected compiler reads the intermediate program and produces, as an output file or files, an executable program having functionality described by the original Cobol source, and which further includes code containing directives that enables parallelism within at least some regions of processing when the resulting executable program is run or executed. The second compiler may also as an alternative produce an object file which is used, typically with other object files, in producing an executable program. In one illustrated embodiment, the first compiler translates in a special way a Cobol program into an intermediate program in the "C" programming language. A second compiler reads as input the intermediate "C" program and builds an executable (object file or executable program file) with parallelization enabled (processing by multiple threads). (Executable program being meant to describe in general terms any sort of file that may be used in processing. Examples of this type of file are an actual executable file, or an object file that can be used to produce an executable file, or a DLL (Dynamic Link Library) file, or any file which at run-time can be loaded or processed and loaded into memory for execution).

In this manner, an executable (or executable program) is produced based upon the input Cobol program, the executable program providing parallelism by utilizing multiple threads of processing during execution. Because of multi-threaded execution or processing, the executable program is typically capable of running observably faster than a program run with no parallelism (single thread). That is, the rate of observable work completed in a given time will typically be improved (i.e. be made greater) when the executable program is processed by multiple processing threads, in comparison to a standard approach in which the executable program (or at least the main part of the executable program) is processed by only one thread. In some cases, the rate of work being completed can be seen to increase at a rate related almost directly proportional to the number of threads used.

The compilation, analysis and translation by a compiler in the first stage of the illustrated embodiment is a specialized translation resulting in an output in a specific syntax, style and having an ordering of output statements and declarations supportive of parallelization. The compiler in the first stage or first phase analyzes the original Cobol program and produces as output, a translated or intermediate program (typically in C/C++ of Fortran) which is specifically organized so as to enable the building of an executable program which provides for parallelism using multiple threads, and whose organization is the same or similar to the organization typically required by a parallelization standard such as OpenMP. That is, the style (constructs chosen for use in the translation) and syntax of the translated output from the first compiler is dependent on the specific parallelization desired and the style necessary in order for the intermediate program to be processed by a second, parallel capable compiler of the illustrated embodiment.

As discussed, the compiler of the first stage produces an intermediate program in a second computer program language, that intermediate program is translated in a manner organized to accommodate and include within the intermediate program parallelization directives that are in form suitable to be processed in a second stage of compilation by a selected second compiler; the second compiler is specifically selected to provide support for parallelization directives such as the exemplary OpenMP standard. The second compiler is utilized to build the executable program, that executable program providing for processing by multiple threads of operation during its execution. The organization, syntax, and style of the components of the intermediate program and the parallelization directives which are generated by the first stage of processing are constrained and designed so as to be compatible and in a form suitable for processing by the second stage (standard) compiler.

The method(s) and approach of the present invention have the potential or opportunity to provide the following several specific improvements and advantages over the above discussed approaches of the prior art:

1) achieving parallelism for a program written in Cobol without requiring the availability of a compiler that provides both support for parallelism and support for Cobol as an input language;
2) achieving better performance than would be achieved by developing a singular new compiler designed specifically for the purpose of supporting parallelism (through multiple threads) during compilation of a Cobol source program; and
3) providing for continued benefit from improvements in compiler technology, evolving hardware support and in general maintenance of a high quality compiler with reduced maintenance costs and less initial investment in compiler development.

The first improvement is achieved through use of the two-step (or two phase, or two stage) approach of the present invention described briefly above. That is, as described with reference to one illustrated embodiment, translating a Cobol source program into C, and then compiling the C program with a second compiler to produce an executable program, the two-step process providing throughout such process provisions for both describing parallelism and for building an output executable program which includes parallelism during execution. This will be described in more detail later herein.

The second improvement is also provided, as part of the two-step approach, by choosing or selecting as the second stage compiler that produces an executable program that is highly performant. That is, since the second compiler is the program that actually builds an executable program, it is very important, in terms of achieving best performance, to choose or select as a second compiler, a compiler that generates as an output, a well optimized, highly performant executable program. This "best" choice of compiler is likely to result in selecting a compiler from a company that is a manufacturer or designer of the processor itself, (such as Intel Corporation), or from a large company such as Microsoft Corporation with many resources in terms of personnel and expertise, and with good relations with the hardware designers. It is possible also that an Open Source compiler such as GNU C/C++ would be a good choice because of the large amount of effort expended by many people to make it a good compiler. The point is that using a very good compiler such as that from Intel Corporation in a second stage of compilation results in producing an executable program that is likely to perform better on that company's hardware than using a methodology based upon development of a single stage compiler.

With regards to the third improvement described above, these maintenance benefits are achieved by utilizing, in the manner just discussed, a "best choice" or "major" compiler as the second compiler. Further, when new hardware evolves, or new compilation or programming efficiencies are developed, the first compiler can be adapted (if necessary) or maintained with very minimal support because it is translating a program into a standard language (such as "C") and therefore changes in technology which are developed are likely to be provided in that standard language, or accommodated by the second compiler. Thus, only small changes to the first compiler are likely to be needed to support advancement; the larger part of the changes most likely to be provided by the "standard" second compiler.

Considering the above again but in more detail, with reference to an illustrated embodiment of the invention, parallelism is achieved by a method that implements a two phase approach. The first phase is a translation performed by a special compiler that operates to translate a Cobol program to an intermediate computer program which is in a second computer language. The translation includes the operations of the ordering of the Cobol statements and the translation of the Cobol statements into a form specifically designed for parallelism which are recognizable by a selected or chosen second compiler.

The second phase is a compilation step, performed by the chosen second compiler, for building an executable program utilizing the intermediate computer program in the second language (i.e. generated from the first phase) as input to the second compiler. The second compiler is utilized to build the actual output executable program or object file. The second compiler is a carefully selected already existing (standard) compiler that supports parallelization (such as OpenMP architecture). The specialized first compiler is designed specifically for the purpose of preparing input in a manner acceptable to the selected second compiler, with the input to the second compiler including description of the program including variables and program flow, description of parallelism, with the program variables and program flow being in form which accommodates the description of parallelism.

This approach provides for parallelism without requiring developing or procuring a compiler designed with both direct OpenMP architectural support and direct support for Cobol as an input programming language. Moreover, this approach overcomes the need for developing such a compiler when a compiler which supports OpenMP architecture is not available in the marketplace for a Cobol source program, and, even if such a compiler were to be available, this approach provides for improvements such as reduced maintenance, improved performance, and better support for outside tools such as debug tools developed by other companies for a common language such as C/C++.

It will be appreciated that it is not just a lack of the availability of any general compiler for achieving parallelism in Cobol that enables an improvement over the prior art. The invention also satisfies a need for performance, a desire for broad machine support, good debug tools, measurement and analysis tools and other similar advantages which are offered by using commercial vendors' tools with these features provided in best form on "important" modern languages, such as, C/C++ and Fortran. With application of the method of present invention, some or all of these advantages are provided for a program written in Cobol while also providing for parallelization utilizing multiple threads of processing during execution of the resulting executable program.

In order to further appreciate how the method of the present invention differs from the typical prior art approach, it is helpful to compare in greater detail, the method of the present invention with the typical approach of providing a parallelizing Cobol compiler through development of a single pass Cobol compiler which directly supports the OpenMP architecture. (While to the inventor's knowledge, no such single pass compiler exists, this approach would be typical of development approaches known in the prior art) This prior art approach, without requiring a very major investment, would likely not achieve the quality, robustness, and broad base of tool support provided by the utilization of a major commercial compiler as a second step in the processing of the Cobol program. In fact, without an intimate knowledge of the hardware and software, it would be likely that even with considerable investment both the performance and the features provided by a single pass compiler would not be as good. Further, support for ever evolving hardware/software platforms and features would require continued maintenance, whereas with the approach and method of the present invention, as improvements are made to the selected commercial compiler, these improvements will be naturally provided without any or with minimal added development on the first compiler.

Because of close and intimate knowledge of the workings of their own company's hardware and software, and because of partnerships with other major commercial vendors, companies such as Microsoft Corporation or Intel Corporation can develop compilers which provide for better optimization and more features than what is likely to be provided by individual developers or developers in smaller or less connected companies. For example, utilizing a major compiler such as a C/C++ compiler from Intel Corporation as a second compiler provides the benefits of good optimization and continued improvement as hardware changes and evolves. According to the teachings of the present invention, using the special compiler in a first phase to perform a special translation of Cobol as for example which includes capability for expressing and describing parallelism within a Cobol program provides for that parallelism in the first phase, and relies on use of an already existing compiler from a major vendor in a second phase and takes advantage of features of both compilers.

The OpenMP standard for parallel processing in C/C++ or Fortran programs already provides directives specifically designed to accommodate the languages of C/C++ and Fortran. Thus, the OpenMP standard provides an opportunity for accomplishing parallelization which is an alternative to building a compiler with completely automatic parallelization, such approach having been shown in the past to be a difficult task for a compiler. Other exemplary prior art approaches for describing or providing parallelization include "MPI" which is a Message Passing Interface", and "PThreads" which IEEE POSIX standard (Institute of Electrical and Electronic Engineers, and Portable Operating System Interface).

The OpenMP standard itself can be found on the OpenMP.org website with the latest version at this being Version 3.0 dated May 2008. As discussed, OpenMP architecture provides a way for a runtime entity to perform processing using multiple threads, with "threads" being an entity that is able to independently execute a stream of computer instructions. Multiple threads may interact, but can also run independently. OpenMP architecture provides for a single set of source files that can be run as a single thread or for enabling multiple threads of operation. Multiple threads may be executed on a single processor, or on a machine with multiple processors and/or multiple "cores". Multiple threads typically work concurrently to accomplish the work of executing a parallel program.

Also, OpenMP architecture provides directives to create teams of threads for parallel execution, to specify how to share work among the threads, to declare and describe both shared and private variables, and also to provide means for synchronization and communication between the threads. OpenMP architecture provides these directives for programs written in the C/C++ and Fortran computer programming languages. According to the teachings of the present invention, and in order to take advantage of utilizing the OpenMP architecture approach and the OpenMP library to create and manage parallel processing in a Cobol program, the Cobol program is analyzed and "translated" by a special compiler with specific regard to accommodating the generation of a parallel executable program by a second compiler. That is, the translation performed by the special compiler includes an analysis of the Cobol program and generation of intermediate program code that is specifically designed to be in a form recognizable by the second compiler. A general straight-forward translation of Cobol to C as typically performed in the prior art will not provide for C/C++(or Fortran) in a form that will allow or enable parallelization. Further, the straight-forward approach of performing a simple translation also does not provide for an intermediate program for which parallelization directives could be inserted as for example, by hand (e.g. by the programmer).

It will be noted that OpenMP architecture provides a fairly small number of directives for describing parallelization in a C/C++ program. A "Parallel Construct" defines a region of code in which parallelization is allowed. "Work Sharing Constructs" provide a mechanism for describing parallelization of loops, single threading of specific sections within a region of parallelized code, and splitting of work into "Sections". OpenMP architecture also provides synchronization constructs such as "Barriers", "Critical" areas, "Atomic" constructs, "Locks" and defining a "Master" thread. The Cobol to C translator developed and utilized according to the teachings of the present invention provides for describing multiple threads in a manner which can be applied to a Cobol program, with the translator transforming the Cobol program to express parallelization in a related C/C++ (or Fortran) transformed program, with this transformed program being written to an intermediate program file for further compilation by a selected second compiler.

Considering as an example, the Cobol programming language provides a statement called a "PERFORM" statement which describes repeated execution (looping) of a specified section of code. In Cobol, a PERFORM statement may describe looping of code that is described in a different area of the program (not immediately following the PERFORM statement). The PERFORM statement works in a manner somewhat similar to that of invoking a subroutine or macro in the C language. The PERFORM statement in a simple translation might be translated to a sequence of code that increments a loop variable and tests for conclusion or termination of the loop with an IF statement, with the work of the PERFORM block being handled as a subroutine call. This translation approach, in general, does not however provide for C/C++ code which allows for parallelization.

As another example, A COBOL PERFORM statement might be translated, in the manner of the prior art (e.g. the OpenCobol.org compiler), into a C "WHILE" statement. This approach however produces C code which is not supported by OpenMP architecture for parallelization because, for example, the "WHILE" construct is not supported by OpenMP for parallelization). Therefore, according to the teachings of the present invention, the first stage of translation is carried out in a manner with the specific intent of producing intermediate program code that is in an order, style, organization and supportive of compilation by a chosen or selected second compiler, that produces parallelization in the output executable program.

BRIEF DESCRIPTION OF THE SEVERAL VIEWS OF THE DRAWINGS

The subject matter of the invention is particularly pointed out and distinctly claimed in the concluding portion of the specification. The invention, however, both as to organization and method of operation, may better be understood by reference to the following description taken in conjunction with the subjoined claims and the accompanying drawings in which:

FIG. 6 illustrates the output produced by the Cobol-IT.org Cobol to C translator when given as input the very simple Cobol program of FIG. 5;

FIG. 7 illustrates the same very simple Cobol program of FIG. 5 with parallelization directives added to describe one region of parallelization;

FIG. 8 illustrates the output from a special compiler implementing a simple translation of Cobol to C according to the teachings of the present invention for the very simple Cobol program of FIG. 7;

FIGS. 9A, 9B, and 9C together illustrate a Cobol source program implementing matrix calculations of intrinsic trigonometric functions sine and cosine (for brevity, these three FIGS. 9A, 9B, and 9C will be referred to herein as FIG. 9);

FIGS. 10A, 10B, and 10C together (for brevity, these three FIGS. 10A, 10B, and 10C will be referred to herein as FIG. 10) illustrate output from a special compiler translating, according to the teachings of the present invention, the Cobol source program of FIGS. 9A, 9B, and 9C into a "C" program suitable for insertion of parallelization directives (with OpenMP pragmas inserted in this illustration);

FIG. 11 provides a comparison of execution times for execution of the Cobol program of FIG. 9 in comparison to the execution time of the same Cobol program with provision for parallelism provided according to the teachings of the present invention;

DETAILED DESCRIPTION OF THE INVENTION

Overview

The present invention provides a method for compilation of an original Cobol program, that method providing for building an executable program with support for multiple threads of processing during execution or running of the executable program. Multiple threads of operation provide in some cases for significantly improved performance in the execution of the Cobol program in comparison to using a single thread of execution. The improvements achieved can potentially provide for a performance improvement approaching 2×, 3× or more as two, three or more threads of processing are applied, in comparison to the performance achieved by the use of a single thread.

Figure 14:
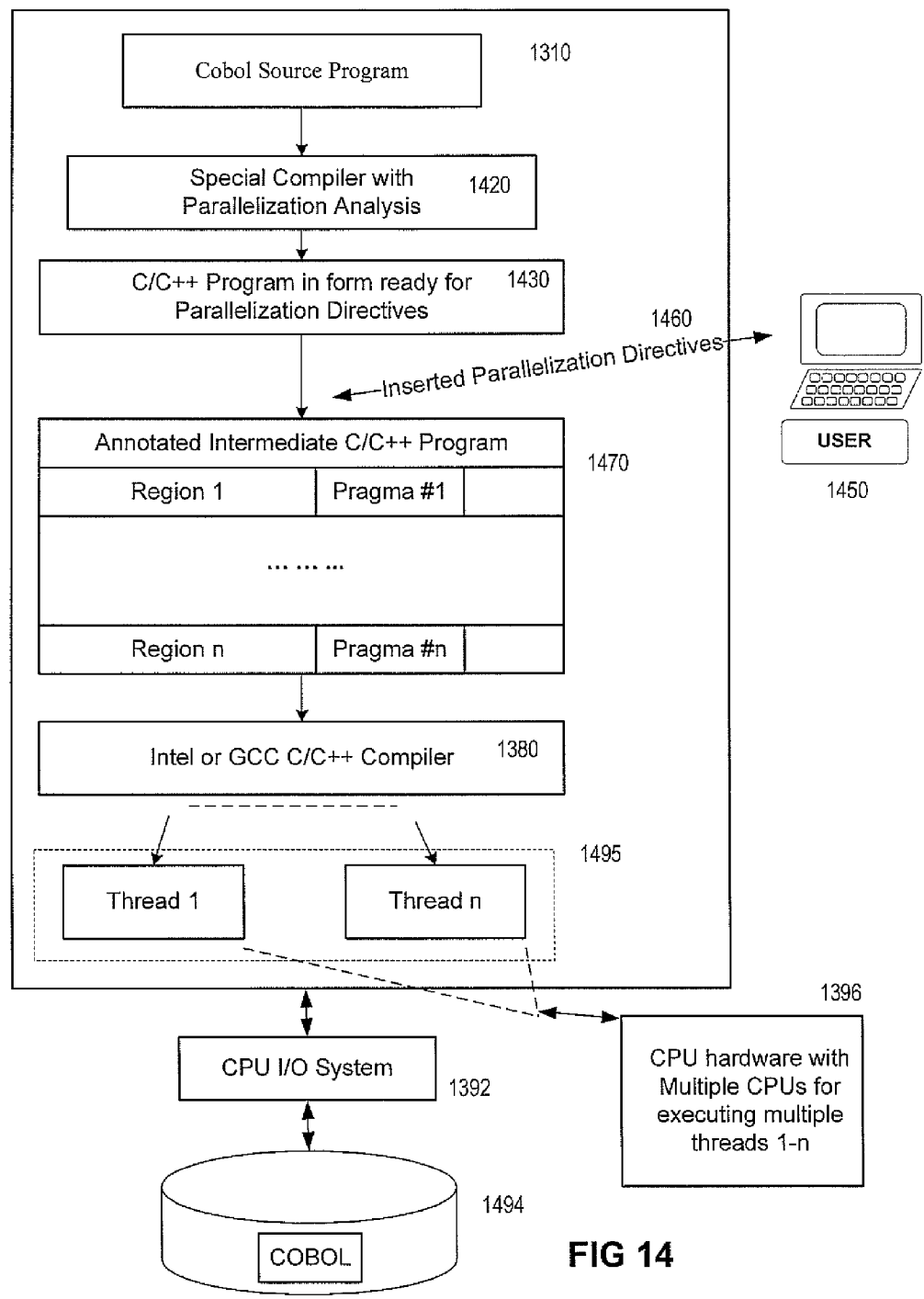
FIG. 14 illustrates, in an exemplary system of one embodiment of the present invention, wherein a user selects regions for parallelization by inserting parallelization directives into "C" code generated by the first special compiler, these directives defining regions of parallelization, and after these insertions have been made, generates a multi-threaded executable with a second compiler.
Figure 15:
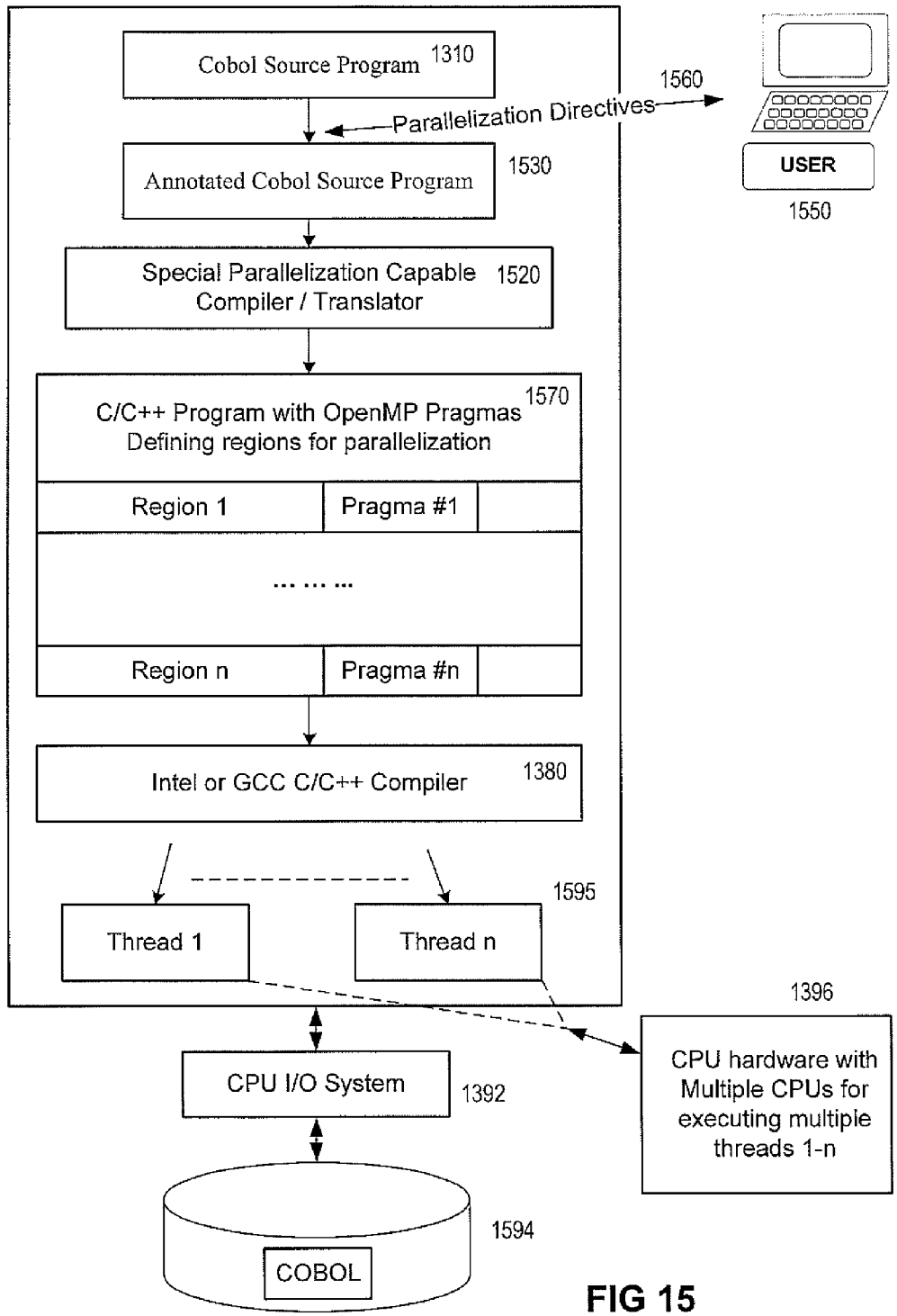
FIG. 15 illustrates, in an exemplary system in another embodiment of the present invention, wherein a user defines regions for parallelization by inserting parallelization directives into an original Cobol source code and a first special compiler then generates a C program which creates C code in a form suitable for parallelization and in which parallelization directives included that are suitable for generating a multi-threaded executable program by a second compiler; and, FIG. 16 illustrates in another exemplary system illustrative of an embodiment of the present invention, wherein a parallel analysis tool with optional guidance by a programmer or user is used to analyze the intermediate C program generated by the first compiler/translator, the analysis providing guidance for either the tool or the user to insert parallelization directives, e.g. in the form of OpenMP pragmas, into the intermediate C program.

As described herein, in an illustrated embodiment of the present invention with reference to FIGS. 14 and 15, a special purpose compiler is utilized to read an original Cobol source program from a computer file system into an addressable memory of a computer system. The variable declarations and the structure of the Cobol program are analyzed in memory and as a result of the analysis specific regions of the Cobol program are identified as having potential for application of multiple threads to the processing in the manner of the original Cobol source program. Regions for potential parallelization may also be identified based upon user input, or embedded content within the Cobol source program itself.

The special purpose compiler provides several functions, the first of which is to translate the Cobol source program into a substantially equivalent program expressed in a second computer language, with the translated output written to a file on the computer system. In this illustrated embodiment, the second language is either C/C++ or Fortran. The special purpose compiler further provides analysis of the input original Cobol program and utilizes the results of analyzing the structure, program order, variable types and other such information based on analysis of the Cobol source program to define regions of parallelization or regions for potential parallelization. Again, selection and determination of these regions may be further based upon both programmer input to help guide the compiler in determining or locating the potential/possible or the best regions for parallelization.

As part of the translation process, the special purpose compiler organizes and arranges the program statements in the second language in an order and in a form suitable for describing regions of potentially parallelizable code to a second compiler; the second compiler being a compiler supporting generation of an executable program which enables parallelism through the use of multiple threads of execution. In this illustrated embodiment, the intermediate program is written to a file operatively coupled to or included within the computer system, and then the intermediate program given to the second compiler program for processing. The parallelization directives may for this illustrated embodiment be in the form of the OpenMP standard. The second compiler reads the intermediate program file, processes it in the memory of the computer system (the same computer system, or a different one), and builds an executable program which is written as output into another computer file, that file being in a special format and marked as intended for execution. The compiler may optionally produce either an "object" file, or an executable file, the object file being a file which can be combined with other objects to build an executable program. The executable program can be specified to be prepared for execution on the same computer on which it is compiled or on another computer, or on different model of a computer.

The method and system of the invention provides for significant potential improvement in the execution time performance of a Cobol program by enabling parallel processing using multiple threads of processing during execution of the Cobol program.

The method and system of the invention provides further advantage in that development of a compiler with direct support for Cobol for example is not required, thus reducing development time and cost, debug time and cost, maintenance time and cost, and significantly increasing potential for reliability of the parallelism constructs in the generated program code.

The method and system of the invention also optionally provides potential for use of existing debug, performance measurement, and program analysis tools which already exist for the already supported form or language, that supported form typically being C/C++, or Fortran, and also typically with the OpenMP approach.

It is a further advantage of the method and system of the invention to provide for Cobol language support, for example, in a generated executable program for debug and application of debug tools and debug environments in the manner currently provided for C/C++ and/or Fortran.

It is a further advantage of the method and system of the invention to provide measurement tools for analyzing performance as an aid to a programmer in determining areas best suited for parallelization.

It is a further optional advantage of the method and system of the invention to provide as part of the overall Cobol compilation process for inclusion of code in the output executable program which would aid in verifying correctness of any multi-threaded execution of a Cobol program.

Translation of a source program described in one computer language to a second source program described in a second source language is not unique or novel. Indeed there are a number of programs that provide for some manner of Cobol to C translation. However, simple translation in the manner described in the prior art does not provide support for parallelization constructs, and further, as discussed above, support for parallelization cannot be provided using the output from a simple translation. Consideration of specific constructs, proper choice of variable types, specific structure and ordering of the code, and other such requirements are necessary to enable parallelism. Thus, in view of the above, it is seen that it is not currently feasible for Cobol programs of any significant complexity to use a simple Cobol to C translation as it exists in the prior art to achieve parallelism in an output executable program. The translation techniques of the prior art are unable to translate Cobol to C in a manner that allows use of OpenMP architectural or parallelization constructs. Further, the prior art manner of translation does not lend itself to the introduction of parallelization constructs such as those used in OpenMP architecture, even if those constructs were to be added by hand by a programmer after to the intermediate file after the translation was made.

In one illustrated embodiment, the present invention provides for translation by a first compiler of an original Cobol source program to an intermediate source program in C/C++ in a specialized manner designed to provide for including for specification, in the manner of OpenMP architecture, of parallelization constructs to be then applied by passing the intermediate source program through a second compiler; the second compiler typically being available from a major vendor, and producing an output executable program that provides for multiple threads of execution, with such multiple threads providing for observably improved performance during subsequent execution of the output executable program wherein the improvement in performance is achieved during execution of instructions within regions of the program designated as supporting multiple threads and the improvement in each region being related to the number of threads utilized during its execution.

A two stage approach of compiling a Cobol program utilizing a known (typically commercial) compiler (second compiler) means that the input format recognized by the known compiler is specified by the manufacturer of that compiler. That is, the input source program to the "known" compiler is provided in a specific form in order to be properly processed by the known compiler. More specifically, according to an illustrated embodiment of the present invention, the input to the second compiler is a C/C++ program, properly formed for processing by the second compiler. In order for parallelization to be enabled, the source to that second compilation further provides for the specification of parallelization constructs in the manner specified by the manufacturer of the known second compiler. And also, the program code is generated such that the parallelization constructs can be successfully applied to enable multiple threads of processing in the output executable program.

For purposes of further illustration of the above, let us assume that the Intel C/C++ compiler is chosen as a "known" second compiler, and that it is to be run with provision in the input source files for OpenMP "pragmas". These "pragmas" are typically processed when enabled by a compiler option. In an illustrated embodiment of the present invention, an original Cobol source program is processed (translated) by a first compiler program according to the teachings of the present invention, and the output of that processing is an intermediate source program in the C/C++ language. This C/C++ intermediate source program is then processed by the Intel C/C++ compiler to produce an output executable or object file. The translation by the first compiler program includes provision for generating OpenMP pragmas in a proper form and includes them in the intermediate source program. The intermediate source program is then submitted for processing by the Intel C/C++ (ICC) compiler, for example, to produce an executable or object file that enables parallelism through the use of multiple threads during program execution.

An important factor in realizing the potential for success using the two stage translation/compilation approach of the present invention is determining and expressing precisely the details of style, ordering, and selection of constructs to be utilized in the expression of the Cobol source program in the intermediate (second) form in order to enable application of parallelization constructs by the second compiler (e.g. example, Intel C/C++ compiler). It is essential that there is correctness in the translation of the original Cobol source program into an intermediate program having the same relative functionality as the original Cobol source program, but expressed or defined in a second language (for example, C/C++), and that the intermediate form generated by the first compiler enables parallelization in a manner that is supported by the second compiler (e.g. Intel ICC compiler). Achieving this requires consideration of a broad number of factors in determining the specifics of the translation process. These factors include utilization of one or more of the following rules or guidelines:

1) providing a method of translating variable names as declared in the original Cobol source program into variable names that meet the requirements of the second language; (for example, changing "-" hyphens to "_" underscores because Cobol allows hyphens in names and C/C++ does not)

2) providing a method of translating variable names as declared in the original Cobol source program so as to preserve recognition by a human when those names are observed after the first translation process; (for example, translating "SAMS-CASH-VALUE" to "SAMS_CASH_VALUE" rather than into a "computer generated" name which is less recognizable by a human such as "X__126")

3) providing allowance for translated variable names which "collide" meaning that alternative naming is to be provided to prevent two variable names in the original Cobol source program from being translated into the same variable name in the second language (C/C++);

4) providing for "Cobol like" parallelization directives such as "OMP PERFORM" (for a Cobol "PERFORM" statement) translated into C/C++OMP pragmas such as "#pragma omp parallel for" (for a C/C++"for" statement);

5) providing for declaration of variables in a manner so that the variables can be instantiated in memory with proper scope so that during execution, processing can be performed by multiple threads without interference between memory references from different threads to the same variables; and, 6) providing for locating the declaration of some variables within the structure of the intermediate source program so as to provide for declaration of the variables within the limited scope of a parallelized region of the code, thus providing isolation of variable data between multiple threads.

The techniques of providing for the translation of a Cobol source program in a manner that enables parallelization to be described utilizing directives such as those provided in OpenMP architecture, through an intermediate program language such as C/C++ or Fortran is further illustrated with reference to examples of the current state of the art described in contrast to the teachings of the present invention.

By way of background, in the prior art, utilizing a single stage compiler without support for parallelization, a Cobol source file describing a Cobol program is typically read in during a first pass of the single stage compiler, and at that time, internal tables are built to describe within the first compiler, the Cobol variables, the Cobol program statements, and optionally the comments within the Cobol source program. These internal tables are then examined during subsequent passes of the first compiler to determine and organize the desired functionality, the desired Cobol variables and their data types and other such information as is standard in a computer program compiler. Once these internal tables are completed, the functionality and flow of the Cobol source program can be understood and analyzed further by the compiler.

Typically, in a standard way, the compiler generates an executable program file that includes machine code or assembly language instructions which implement the desired Cobol program functionality, including initialization and preparation of the data structures. Providing support for many different hardware platforms and operating system software platforms however may require significant development and verification when this approach is used.

It is noted that in the OpenMP standard a region of code is defined within the standard as "all code encountered during a specific instance of the execution of a given OpenMP construct or library routine. A region includes any code in called routines, as well as any implicit code introduced by the OpenMP implementation".

DISCUSSION OF FIGURES

Figure 1:
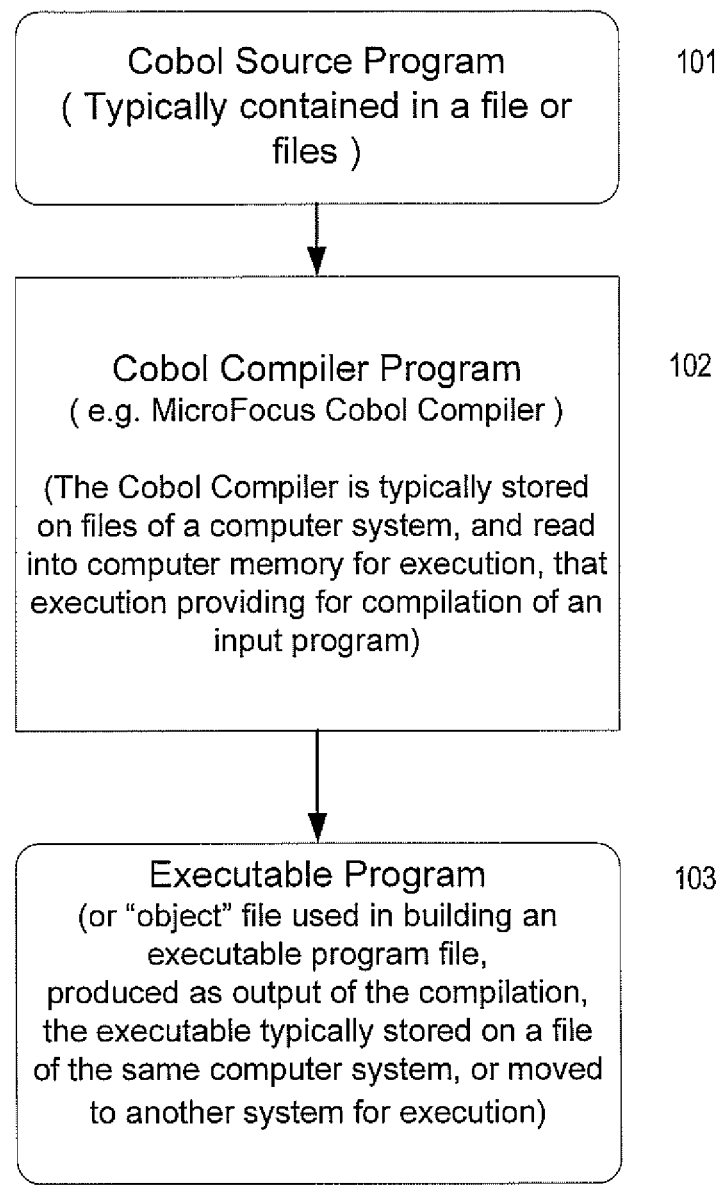
FIG. 1 illustrates a compilation methodology of the prior art in which a Cobol program is compiled without support for parallelization, and by a single phase approach using a single compiler.

FIG. 1 illustrates the flow of a typical prior art method providing for compilation of a source program to produce an executable program, or object file. In FIG. 1, a Cobol Source Program 101 is typically contained in either a single file, or several files which are stored within the files of a computer system. A Cobol Compiler Program 102 such as a Cobol compiler from the MicroFocus company is used to read in the Cobol source program from the file or files containing the Cobol source program. The Cobol compiler program compiles the Cobol source program and produces, as output, an Executable Program 103 typically stored on a file of the computer system. As is well known in the art, compilers also produce files in other formats such as "object" files which can later be used to build an executable file. The term "executable" is meant to be interpreted broadly in a general manner meaning any output form which describes a program such that it is ready, or can be easily be made ready for execution or combined with other files so as to be ready for execution or running. The term "executable" thus encompasses the output of a compiler in a form ready for execution, "linking", "dynamic linking", or other similar terms used in the computer art. That is, the term can be used to describe or refer to a program that has been compiled to produce "executable" instructions. The executable instructions may also take the form of "byte code".

Figure 2:
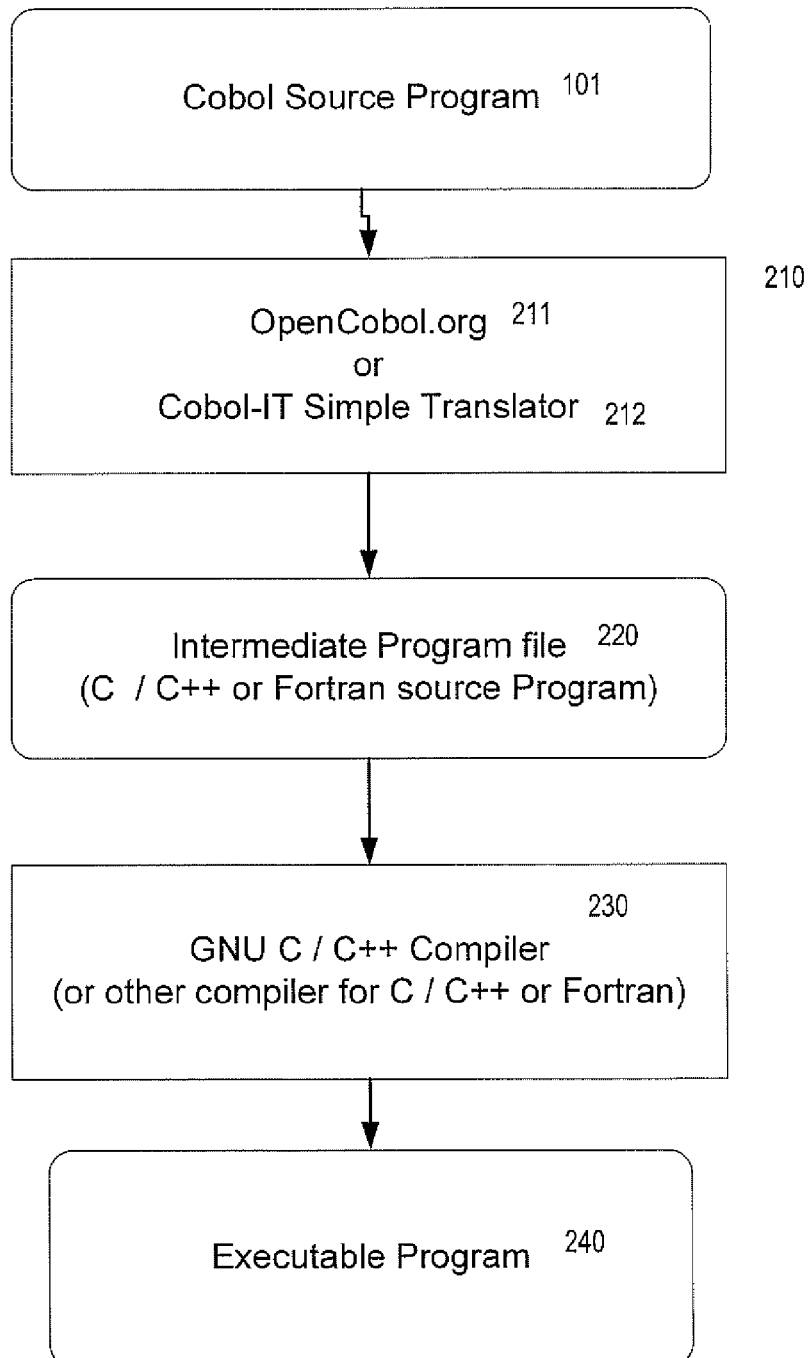
FIG. 2 illustrates a compilation methodology of the prior art in which a Cobol program is compiled using a typical straight-forward translation of a Cobol source program into a second language illustrated as the "C" language, followed by a compilation by a second compiler illustrated as the GNU C compiler, an industry standard compiler.

Another approach of the prior art for providing compilation of a Cobol program is illustrated in FIG. 2. This prior art method provides for generation of an executable program using two distinct phases of processing. The first phase provides for compilation by a first compiler to translate a program from a first language into a second language, (instead of outputting of machine code or assembly language). Then, the computer program in the second language is fed into a second compiler, which supports (understands) the second language, to produce an output executable. That is, a first compiler produces a second computer program in a second language instead of an executable, with the second computer program describing the functionality of the Cobol program in that different or second computer programming language. This second language is then compiled by a second compiler to produce in a standard way, an output executable. This output executable from the second compiler will perform functionally as described by the programmer in the original Cobol source program, even if the second compiler did not provide support for input in the first language of Cobol. This approach to translation of a Cobol source file to a second source file, the second source file being in an intermediate language, followed by compilation of that second source file with a second compiler to produce an output executable, has been described and implemented in an open source compiler from the organization OpenCobol.org. OpenCobol.org offers a compiler that translates Cobol to C (or C++). The OpenCobol compiler is used to read in a Cobol source program and perform a translation to C which is written to an intermediate output file. The intermediate output file is then provided as input to a second compiler which is typically a standard C compiler such as GCC (GNU Compiler). The second compiler reads and compiles the C language description in the intermediate file and generates either an output executable, or an object file that can be used to build an executable. The output executable performs the functions described in the original Cobol source program. The approach used by OpenCobol.org in their OpenCobol compiler is described on the OpenCobol.org website as follows:

"Open COBOL is an open-source COBOL compiler. Open COBOL implements a substantial part of the COBOL 85 and COBOL 2002 standards, as well as many extensions of the existent COBOL compilers.

Open COBOL translates COBOL into C and compiles the translated code using the native C compiler. You can build your COBOL programs on various platforms, including Unix/Linux, Mac OS X, and Microsoft Windows."

FIG. 2 illustrates the compilation process intended for use by the approach of the OpenCobol.org compiler as it is offered to the public today. The same approach is also provided by another similar compiler from another company called "Cobol-IT" (a French company with offices in Paris) which has built a compiler based upon a fork from the OpenCobol.org compiler. As shown in FIG. 2, a Cobol Source Program 101 is processed by a simple translating program 210 such as the OpenCobol.org translator 211 or the Cobol-IT Translator 212. The simple translator 210 translates Cobol in a straight-forward manner into an Intermediate Program 220 written to a file and described in a second language such as C/C++(or Fortran) a program containing functionality equivalent (or substantially equivalent) to the Cobol source program. The intermediate program file is then processed in a second phase by a second compiler such as the GNU C/C++ compiler 230. The GNU compiler then performs a compilation of the intermediate program and produces an Executable program 240 (or "object" file as discussed previously).

The standard language translation approach as implemented by OpenCobol.org shown in FIG. 2 does not however provide any support for parallel programming, and in fact generates intermediate C code that is not suited for the addition of parallel programming constructs or directives, even by hand, in the intermediate output.

In the translation approach of OpenCobol.org and computer language translation approaches of the prior art, assumptions are made for ease of programming, and techniques of translation are chosen which expedite implementation of the translator, and/or efficiency of the generated code. These approaches and assumptions typically result in a translated output that is not suitable for the addition or inclusion of parallelization constructs, even if attempted by hand, because the translated code, although functionally operative and correct, is not expressed in a form to which parallelization constructs can be applied. The "problems" posed in trying to adapt a translator of the prior art for an application enabling parallel programming are not readily apparent until an attempt is made to use the intermediate code and to try to accomplish parallelization.

As a first example, it can be observed using the OpenCobol.org compiler that variables in the original Cobol program are translated to variable names which are unrelated to the original Cobol variable names. For example, Cobol variables "total-amount", "final-value" and "balance" may be translated to C variables such as "a__5", "a__6" and "a__7" respectively. This does not affect the functionality of the executable output, because the internal variable names used in describing an application program or any computer program in Cobol (or any other language) are typically invisible to the actual user of that application program. However, parallelization oftentimes requires detailed study and analysis of the variables within a program, both during a first step of designing and describing proposed parallelization, and also in debugging an application in which parallelization may not be producing expected results. It is a significant improvement to provide variable names which are readily understood by the programmer with reference to the original Cobol variable names rather than creating and utilizing "computer generated" names which make little sense at first glance.

Continuing with a discussion of variables and variable names, the word "scope" is typically used as a general term describing the visibility or accessibility to a variable in a program. For example, an index variable in a program loop may or may not be "visible" outside the code of the loop itself. In attempting parallelization, it is often important to analyze a variable's scope, for example, when multiple threads may either share or make private certain specified variables when the code referencing those variables is to be executed by multiple threads. Tools for analyzing variables by name are available, one example being a tool called "ThreadChecker" available from Intel Corporation.

As a second example, the Cobol language typically provides for variable types which exist statically in memory. That is, Cobol variables which are visible only inside a subroutine are typically not created on entry to the subroutine and then released upon exit from the subroutine. This simplistic approach is both good and bad in that it may require more memory to "persist" or always keep static variables in memory, but less time is taken in creating and releasing variables on a memory stack. With modern hardware, memory stacks are often accommodated quite efficiently with hardware support for a stack approach, so the benefits or disadvantages of not utilizing a stack are not necessarily predictable; it depends on the specifics of the program itself. For parallelization, a stack approach may be preferable because variables that are used only within a parallelized region can be created as threads are created and these variables are then automatically isolated from each other (between threads). Standard translation of Cobol to C as, in the manner of Open-Cobol, does not provide for this alteration in variable scope and/or type.

As a third example, variables in Cobol which are independently named may be translated into variables which are simply references to locations in memory or an array in memory. For example, Cobol variables "X", "Y", and "Z" may be translated to references to array locations "ARRINT [122]", "ARRINT [125]" and "ARRINT[321]". This choice prevents a programmer from choosing parallelization which keeps "X" in static memory, for example, and which would put "Y" in private stacked memory because the C programming language does not allow one location in an array to be defined with a different memory management type than another location in the same array.

A fourth example regards optimization typically done by standard compilers to provide for more efficient (faster) execution. Optimization by a compiler may combine the processing of several statements into one piece of generated machine code. Optimization may also move code in and out of loops if the compiler/optimizer decides that is both beneficial and still correct. There are many types of optimization. For parallelism to succeed however, optimization cannot be applied across the boundaries defined for parallelization. For example, initialization of a variable which is described inside a PERFORM block of Cobol code might be moved outside the PERFORM block and done instead just prior to entering the PERFORM code, if the compiler determines that will still result in correct operation. However, when "parallelized", it might be a requirement for correct operation to retain initialization within every thread of execution utilized in parallelizing a PERFORM statement. Therefore, the translator should be prevented from making certain optimizations which "cross" parallelization boundaries.

A fifth example is the choice of constructs chosen for use in the translation of Cobol source code to another language. For example, a "PERFORM VARYING" construct in Cobol might in the prior art be translated "correctly" to C code which might implement the checking for completion of the loop using a C "WHILE" construct. However, although functionally correct, a C "WHILE" construct is not supported for parallelization by OpenMP. Another approach may be to break down a PERFORM statement into a more primitive faun in a second language and express the functionality of the PERFORM using simple compute statements and IF statements. For example, a PERFORM n TIMES in Cobol could be translated into a series of statements in the C/C++ language such as:

```
index = 0;
LOOP:
    IF( index < n ) {
        process body of perform;
        index = index + 1;
        goto Loop;
    } else . . .
. . . proceed with following code . . .
```

Code in this form however does not enable parallelization using OpenMP because there is no explicit loop construct (i.e. the loop is implemented using a "goto" statement rather than with a "for" statement).

Another more complex example is illustrated with the Cobol same "PERFORM n TIMES" construct. This construct causes looping of the code a specified number ("n") times. Outside the loop, and typically just prior to the loop, variables which vary with each pass through the looping code are initialized, and then within the loop, typically at the beginning or end of the loop, these variables are modified. When a construct such as this is parallelized, the code for determining the value of a variable during each pass through the loop is required to be based upon a variable which is related to the pass number for the loop. This may require that a variable be created by the translation program that does not exist within the original Cobol source, and that created variable is used as the basis for determining the value of variables as passes are made through the code by each of a plurality of threads.

Therefore, in order for parallelization to be successful a translation approach is utilized which implements a COBOL "PERFORM n TIMES" using the C/C++ construct of a C/C++"FOR" loop.

Often, it may also be true that it is not until the details of proposed parallelization are analyzed by a programmer that it can be decided precisely which approach to translation will provide the most benefit in terms of enabling parallelization. Therefore it is a further advantage in accomplishing parallelization if the programmer is provided with constructs to "suggest" a proper method of translation. These "suggestions" would probably be implemented as new "pragmas" for influencing the translation process. Of course other methods of providing these guidelines or "suggestions" to the translation process would be readily apparent to one skilled in the art.

Figure 3:
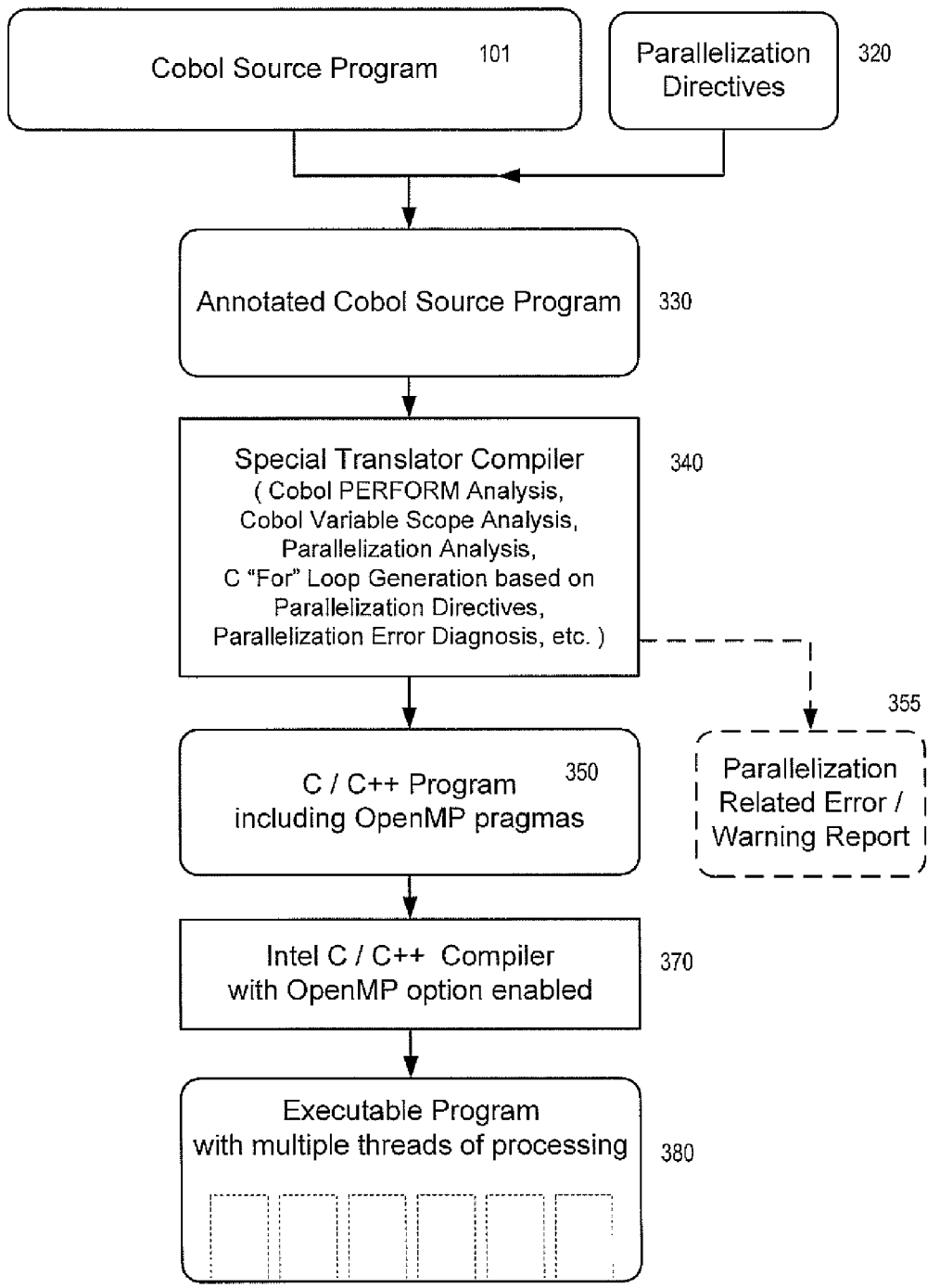
FIG. 3 provides illustration of the compilation of a Cobol program according to the teachings of the present invention using a two stage compilation process which includes as the first stage, use of a specialized compiler which prepares an intermediate program that includes provisions for parallelization directives, an intermediate program style and ordering that supports parallelization.

FIG. 3 illustrates a method according to the teachings of the present invention that provides for the compilation of a Cobol Source Program 101 combined with Parallelization Directives 320 being inserted into the Cobol Source Program 101 in a programmer defined manner to form an Annotated Cobol Source Program 330. The Cobol source program is typically stored on a file within a computer system, and the Annotated Cobol Source can either be maintained as a separate file, or the annotation version can be made a part of the original Cobol Source program (for example, using a "pragma" approach). The Annotated Cobol Program 330 provides a complete description of the functionality of the Cobol source program 101 and also further provides programmer provided information describing where and how the programmer wants parallelization to be implemented. The Annotated Cobol Source Program 330 is typically also stored on a file in the computer system. A Special Translator Compiler 340 is directed to read the Annotated Cobol Source program 330, to analyze that program and the features of that program as described above. The special compiler generates as its output a C/C++ Program 350 which includes within it parallelization directives 351 to described the programmer suggested parallelization for the Cobol program 101 in manner suited to the generated C/C++ program 350. Note also that the first compiler optionally produces an Error/Warning Report 355 when the compiler discovers after analysis that parallelization cannot be achieved.

The intermediate C/C++ program 350 is then given over for processing by a second compiler 370 such as the Intel C/C++ Compiler, which provides for parallelization of programs using OpenMP. The Intel compiler then produces as its output, an Executable Program file 380 which is an executable that provides for multiple threads of processing when that executable program is executed (run). As mentioned previously, the executable can also be in the form of an "object" file.

Figure 4:
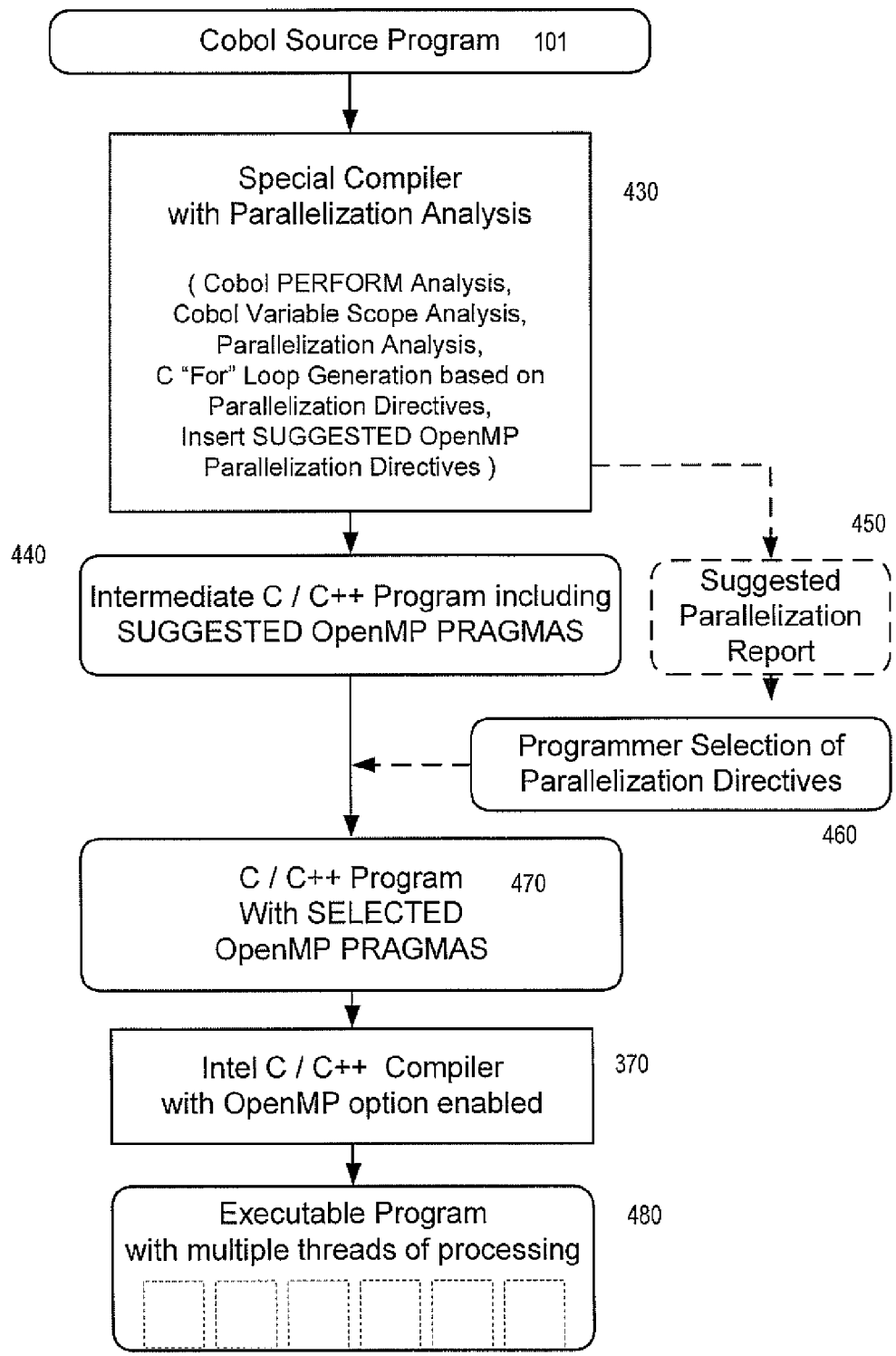
FIG. 4 illustrates a compilation flow depicting a specialized compiler that analyzes program constructs within an input Cobol program and produces suggested parallelization directives and OpenMP pragmas, and further optionally provides a parallelization report describing to a programmer suggested regions of parallelization identified by the special compiler, and further, optionally, provides a description of problems with certain Cobol constructs that prevent parallelization of specific regions of Cobol program code.

An alternative approach to achieving parallelization in another illustrated embodiment according to the teachings of the present invention is illustrated in FIG. 4. In this illustration, parallelization is achieved by having the first stage Special Compiler 430 analyze a Cobol Source Program and "suggest" parallelization regions, that is, regions where the special compiler suggests parallelization might be achievable based upon analysis of the Cobol program flow. The special compiler produces a C/C++ intermediate Program 440 which includes within it, suggested OpenMP pragmas defining potential or suggested regions of parallelization within the C/C++ program 440. The Special Compiler 430 also optionally produces a report describing in more detail information related to each suggested region of the Parallelization Report 450. As indicated in block 460, the programmer can then examine the C/C++ intermediate Program 440 and make the selection of parallelization regions for processing by marking that selection in a file 470. This file 470 is then processed in a normal manner by the second compiler 370 to build an output executable 480 with parallelization. With this approach, the special first compiler serves as an aid to the programmer in looking for and identifying potential regions for parallelization, the special compiler basing its suggestions on analysis of the Cobol program statements and variable declarations.

Figure 5:
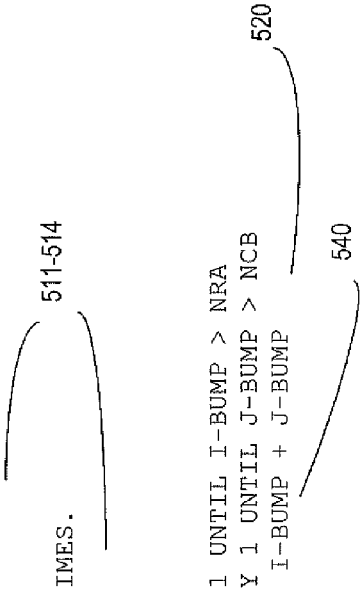
FIG. 5 illustrates a very simple Cobol program for demonstrating conversion of a Cobol program to a C program according to the prior art by a compiler from Cobol-IT.org which is based upon the OpenCobol.org Cobol to C compiler.

FIG. 5 illustrates a very simple Cobol program which will be used as an example to illustrate the prior art approach of translation in contrast to performing the translation according to the teachings of the present invention. In FIG. 5, a Cobol program is shown which includes declaration of a two dimensional array called "Table-C" corresponding to reference lines 511-514. As indicated in reference line 520, the Cobol program performs a simple calculation of filling the array (table) with each entry in the table being assigned to hold a number which is the sum of the two indexes 540 into that location in the array Table-C.

FIG. 6 illustrates a portion of a computer listing of an intermediate C program produced by using the Cobol-IT compiler (prior art) to translate the Cobol program of FIG. 5 into a C program (partially shown in FIG. 6 in reference lines 601-624), the compiler being used to illustrate translation typical of the prior art, is not suitable for use in the present invention. FIG. 6 provides only a key portion of the translated program for discussion, that portion being the C code which actually performs the work of filling the table with the sum of its indexes (i.e. shown in FIG. 6 reference lines 611-619). An example of the entire output program produced by the Cobol-IT compiler (prior art) is provided in Appendix A pages 1 through 8.

FIG. 7 illustrates a translation of the same Cobol program 500 into a second C program 700, with that translation performed according to the teachings of the present invention. This translation 700 in FIG. 7 is shown in contrast to the translation 600 in FIG. 6 of the prior art, to illustrate in its simplest form some exemplary basic features of a Special Compiler/translator 430 that incorporates the teachings of the present invention.

In FIG. 6, it can be seen that the prior art compiler generates a "while" loop (i.e. shown in reference line 610). This while loop could not be parallelized because OpenMP does not support the "while" construct.

It can be seen also that an "IF" statement (i.e. shown in reference line 620) is used to evaluate the looping variable for exit from the loop. This manner of loop control is also not supported by OpenMP.

It can also be observed that the variable names within the code designated as FIG. 6 reference line 630 are not related to the variable names used in the Cobol program of FIG. 5. Further, some variables are provided as pointer variables or intermediate pointer variables (i.e. shown in FIG. 6 reference line 640). These constructs are not easily maintained in implementing parallelization using OpenMP.

It is also noted that the translation illustrated in FIG. 6 does not provide a human predictable translation of variable names so that parallelization directives which relate to variables specified by Cobol variable names can be easily applied to the C/C++ code in the generated code.

FIG. 7 presents approximately the same Cobol program 700 (i.e. shown in reference lines 701-732) as presented in FIG. 5, further including within the program exemplary parallelization directives 718 719 725 726 in an exemplary style, as might be interpreted by a special compiler designed for translating Cobol to C with provision for parallelization. Line 18 (i.e. shown in reference 718) defines the beginning of a region in which multiple threads are to be utilized; therefore the threads can be created at this point in the program 700. Line 19 (i.e. shown in reference 719) defines the beginning of a loop that will utilize the multiple threads in doing the work described within the loop. Line 25 (i.e. reference 725) defines the end of the multi-threaded loop, and line 26 (i.e. reference 726) defines the end of the parallelized region. The need for reference line 725 could be eliminated if the compiler is programmed to automatically find or detect the end of the loop based upon analysis of the Cobol program structure, this being performed as a further part of the special parallelization analysis.

FIG. 8 illustrates exemplary output of a special compiler for translating Cobol to C code with provision for parallelization. The output is in the form of a C/C++ program (i.e. shown in FIG. 8 as reference lines 800-829). This program illustrates variable names translated into human readable variable names as illustrated in reference lines 802 to 811. The parallelization directives illustrated in FIG. 7 as reference lines 718, 719, 725 and 726 are translated into OpenMP pragmas for the C/C++ language, in a format that will be interpreted properly by the GCC or Intel C/C++ compilers. FIG. 8 reference line 813 illustrates an OpenMP pragma defining the start of a parallel region. Line 814 illustrates an open brace that begins and contains the parallel region, which is ended in reference line 821 with a closing brace. An OpenMP directive is presented in reference line 815 which informs the second compiler that the following line contains a C/C++"FOR" loop in a form suitable for parallelization. It is noted that the parallelization generated by the first compiler is provided in a form that is acceptable to the second compiler. The translation transforms the Cobol program flow into one that is acceptable for parallelization using OpenMP directives. If transformation cannot be achieved, an error report (as shown in FIG. 3 reference 355) may optionally be generated by the first compiler.

FIGS. 9A, 9B, 9C, (FIG. 9) FIGS. 10A, 10B, 10C, (FIG. 10) and FIG. 11 together are used to illustrate the application of the teachings of the present invention to an exemplary Cobol source program 900 (Matrix3P.cb1) whose sections are shown in FIG. 9A reference lines 901-924; FIG. 9B reference lines 925-954 and FIG. 9C reference lines 955-970. The illustration is used in showing an exemplary performance gain achieved through the application of one or more aspects of the present invention.

FIG. 9A illustrates the Cobol source program as including an Identification Division 902, a Program-ID Section 903, a Data Division 904, and a Working Storage Section 905 corresponding to reference lines 906-924, the Working Storage section containing the declaration of variables and data storage used internal to the Cobol source program 900. Three table type variables of section 905 are declared with names "TABLE-A" 911, "TABLE-B" 916, and "TABLE-C" 921. As indicated, the three tables are equal sized tables with 200 rows and 5000 positions each cell of the table containing a single floating point number. Two additional variables 906, 907 which are "BINARY" type variables are declared for pointing to entries within the tables, and a third "BINARY" type variable 909 is declared which is used for looping through the program enough times to allow for an accurate execution time measurement.

FIGS. 9B and 9C together illustrate the Procedure Division 925 of the same Cobol source program 900, and describes the processing to be performed by the Cobol program 900 during its execution. FIG. 9B illustrates the initialization of data within the three tables (i.e. TABLE-A, TABLE-B and TABLE-C) contained in reference lines 933-938, 941-946 and 949-954. FIG. 9C illustrates performing a trigonometric sin and cosine calculation in reference line 960 using the contents of two of the tables A and B and putting the result into the third table C. FIG. 9C further illustrates the Cobol program source code in reference line 965 for printing out (displaying) one exemplary value from the result table which is TABLE-C 921.

FIGS. 10A, 10B, and 10C together are an illustration of exemplary output from a special compiler, sometimes referred to as a "first compiler" in this discussion, in which the Cobol program 900 shown in FIGS. 9A, 9B, and 9C is used as input. The special compiler is utilized to translate the Cobol source program of FIG. 9 into a C program 1000 illustrated in FIG. 10 corresponding to

[FIG. 10A Reference lines 1001-1025;
FIG. 10B Reference lines 1026-1054; and,
FIG. 10C Reference lines 1055-1079;]

with the result that the C program is in a form suitable for successful application of parallelization directives by a second compiler. FIG. 10A corresponds to a C translation based upon the Cobol source code shown in FIG. 9A. FIG. 10B corresponds to a C translation based upon the Cobol source code shown in FIG. 9B. FIG. 10C corresponds to a C translation based upon the Cobol source code shown in FIG. 9C. The entire program, as exemplified in FIGS. 9A, 9B, and 9C, however is typically read as a whole into the first compiler, in order that the first compiler will have available to it knowledge of the overall program such as variable declaration types, names and other such information as it is making a translation of the input Cobol source program in its entirety into a related C program with provision for parallelization.

In FIG. 10A, variable declaration statements in the C/C++ programming language included in reference lines 1009-1913, 1015-1019, 1021-1025 are shown which relate to the Working Storage Section of the Cobol source program. Tables A, B, and C are translated from Cobol form to a C "STRUCT" which contains within it these three tables in the same memory format as would be defined by a normal single pass Cobol compiler (such as MicroFocus Cobol compiler). The variable names are translated in a human predictable manner as in this example from a name such as "TABLE-A" in Cobol reference line 911 into "TABLE_TABLE_A" in "C" reference line 1009. In similar manner, a "BINARY" type variable in Cobol is translated from "I-BUMP" reference line 906 into "I_BUMP" in the "C" code reference line 1004. The "level" or "scope" of the variables declared in the "C" code may be or are dependent on the parallelization directives in the original Cobol source program.

In FIGS. 10A, and 10B executable "C" program code of reference lines 1026-1054, 1055-1079 is illustrated as being produced by translation of the Procedure Division of the original C program, in a manner supportive of the application of parallelization directives, shown for exemplary purposes as being translated into OpenMP style parallelization pragmas.

Within FIGS. 9B, and 9C inserted parallelization directives (reference lines 930 933 941 949 956) are shown illustrating Cobol parallelization directives which are translated by the first compiler into related illustrative OpenMP parallelization directives (reference lines 1029 1033 1041 1049 1058 respectively) which are in the form of pragmas. In the manner and style of OpenMP for "C", according to the teachings of the present invention, Cobol parallelization directives have been defined which are translated by the first compiler into OpenMP pragmas, and the program code is further translated by a second compiler in a manner that supports the application of the OpenMP pragmas. Within FIG. 9B, reference line 930 illustrates a Cobol parallelization directive, expressed in Cobol comment form (pragma) which is then translated in a related way into an OpenMP pragma as shown in reference lines 1029-1030 in FIG. 10B. In similar manner, reference lines 933-934, 941-942, and 949-950 in FIG. 9B are translated in a related way into OpenMP pragmas as shown in reference lines 1033-1034, 1041-1042, and 1049-1050 respectively in FIG. 10B.

It will be noted that the executable "C" code as shown in reference lines 1034, 1042, and 1050 in FIG. 10B are "C" "FOR" statements expressed in a form suitable for application of the preceding OpenMP Pragma statements in reference lines 1033, 1041, and 1049 respectively. Note also that the paired braces ("{ ... }") surrounding the "C" code of each "FOR" loop on reference lines 1034-1038, 1042-1046, and 1050-1054 in FIG. 10B correspond to the regions of code defined by the corresponding "PERFORM" and "END-PERFORM" statements in the original Cobol source code, to which the parallelization directives have been applied.

FIG. 11 reference lines 1101-1127 illustrate sample run times for the original Cobol source program 900 shown in FIG. 9, in which the generated "C" code as in FIG. 10 uses two methods of compilation. As shown, the first compilation designated in reference line 1102 ignores the OpenMP pragmas resulting in an executable with a single thread of execution. The second compilation 1103 utilizes OpenMP to enable generation of an executable which in this illustrative example uses three threads. With one thread, the exemplary Cobol program is timed using the "time" command in reference line 1107 and executes from beginning line 1107 to end line 1110 in 26.04 seconds (i.e. shown in reference line 1112). With three threads, the exemplary Cobol program is timed with the "time" command in reference line 1118 and executes from beginning line 1118 to end line 1121 in 10.68 seconds (i.e. shown in reference line 1123). This comparison illustrates an execution time performance improvement ratio of 2.43, with the improvement being accomplished by implementing one or more aspects of the teachings of the present invention in an illustrated embodiment of the present invention.

Figure 12:
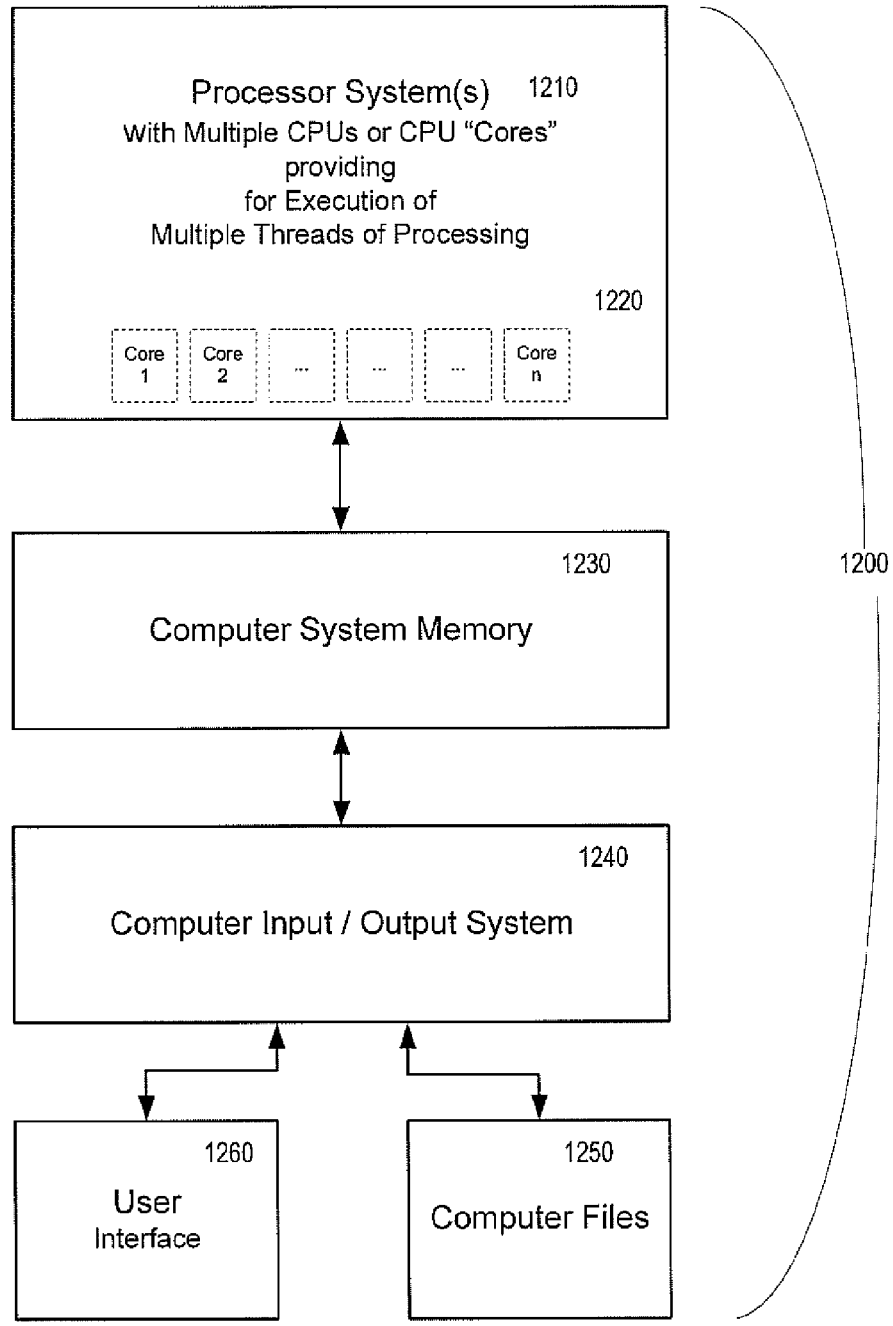
FIG. 12 illustrates computer system hardware suitable for utilization in performing the steps of the method of the present invention and also as a platform for executing a program using multiple threads of processing in the manner described for running the executable program produced by the steps of the method of the present invention.

FIG. 12 is an illustration of a computer system 1200 which provides hardware facilities for implementing the teachings of the present invention. The computer system includes a Processor System 1210 which includes Central Processing Units or Central "cores" 1220 which perform processing in a conventional manner. A computer system with a single processing unit could also be used for implementing the two stages of the compilation methodology according to the present invention. As shown in FIG. 12, the computer system includes a Computer System Memory 1230, a Computer Input/Output System 1240 and a number of Computer system Files 1250. The original Cobol source program is typically stored within the Computer system's File system 1250, accessed through the Computer system's Input/Output System 1240, and read into Computer System Memory 1230 for analysis by a first compiler. Following analysis, an intermediate file is written to the file system 1250, and then accessed in similar manner by a second compiler represented as a second block to produce an executable file which is written to the file system 1250. A user may interact with the computer system and edit files through a User Interface 1260 typically operatively coupled to the input/output system of the computer system for the purpose of influencing the steps of the methodology to be followed such by specifying options for the first or second compiler. The executable program file is executed (or "rnn") on this same computer system 1200, or moved to another computer system. Running the program with multiple threads, especially on a computer system with multiple CPUs or cores 1220 typically provides significant performance improvement over equivalent execution with only a single thread. In many cases performance improvement can be achieved which is almost directly related to the number of threads. For example, if one thread has performance of 1.0, then two threads might have performance of 1.9, and three threads might perform at 2.7, for example. There are of course limits on the number of threads which can be productively applied to most problems, as is well known in the art. Improvement in performance which is a reduction in execution time is observable by a user through the user interface 1260 using job monitoring programs that are well known in the art.

Figure 13:
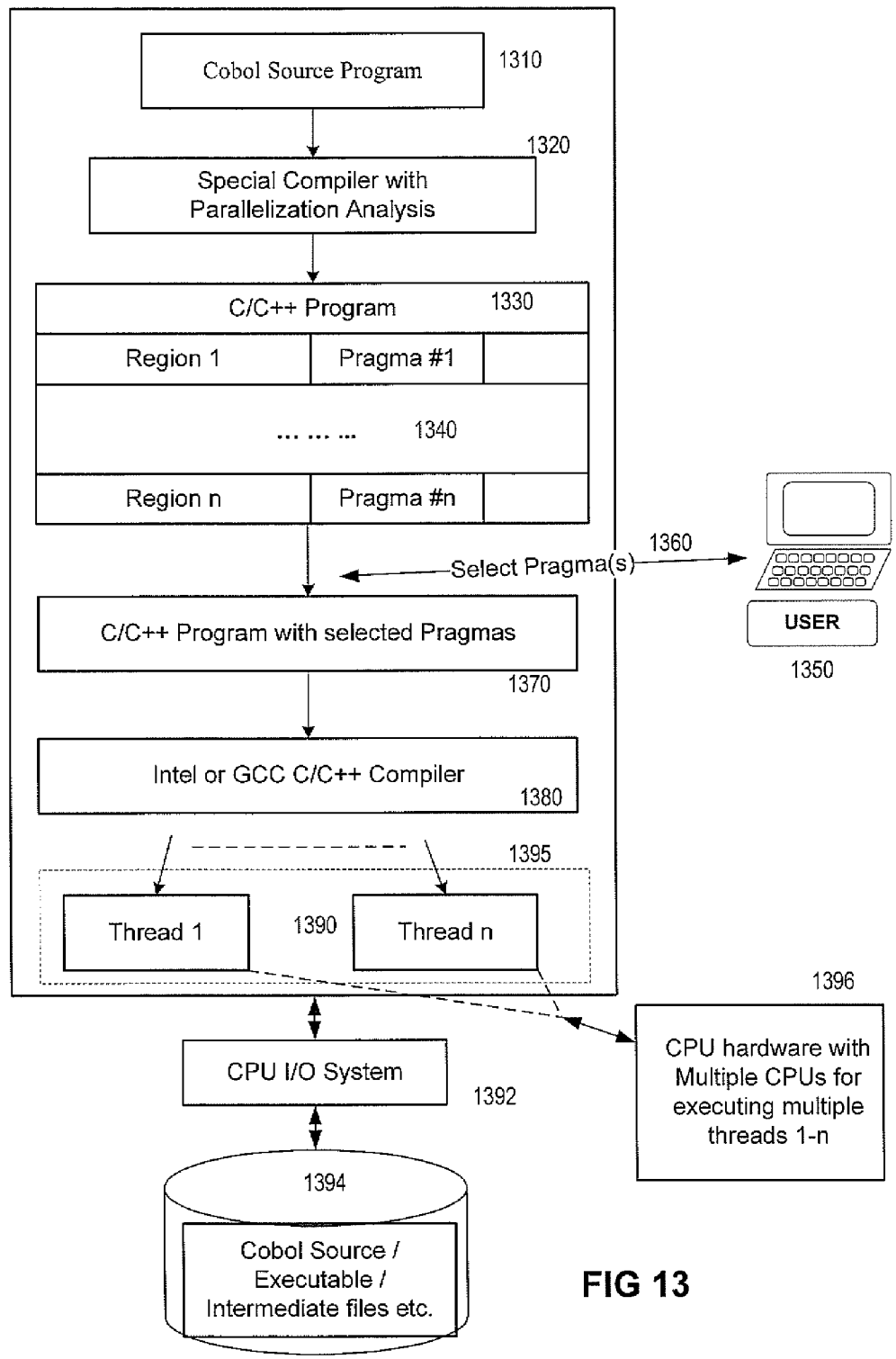
FIG. 13 illustrates, in an exemplary flow chart illustrating at least one embodiment of the present invention, a flow wherein a user selects regions for parallelization from one or more suggested regions of parallelization generated by a first compiler, and after such selection(s) generates a multi-threaded executable with a second compiler.

FIG. 13 illustrates processing a Cobol Source Program 1310 in an exemplary manner according to the teachings of the present invention using a first compiler which is a Special Compiler/translator program 1320 which performs analysis of potential parallelism on the Cobol source program. The first compiler 1320 generates as its output an intermediate computer program in a second programming language 1330 which in this example is a C/C++ program; this program in the second language is uniquely related to the Cobol Source Program 1310 in that it describes a program providing functionality which is either identical or very substantially related to the program described by the Cobol Source Program. This intermediate C/C++ Program (program in a second computer programming language) 1330 includes within it regions of the executable code 1340 which have been identified by the first compiler as having potential for implementing parallelization. The parallelization may be easily recognizable in some cases, or the parallelization potential may be achievable only after the further tuning of the Cobol program, or possibly only after editing the C/C++ program. The regions of parallelization 1340 within the C/C++ code could include, for example, in the terms of the OpenMP standard, C/C++"FOR" loops that have been translated from "PERFORM" statements in the original Cobol source code. The regions might also be loops that have been identified, for example, by flow analysis of the original Cobol based upon analysis of "IF" statements, branching statements, conditional branching statements, and indexes upon which conditional branches are based.

A User 1350, typically a programmer, selects for inclusion (further processing) 1360 via (for example) a workstation or terminal device, one or more of the regions of potential parallelization. The selection might be made by deleting (or commenting out) parallelization directives that are not selected or selection might be made in many ways readily apparent as could be easily determined by one skilled in the art of programming.

After the selection has been completed, a C/C++ program file 1370, which includes the selected pragmas presented in a manner so that they will be processed, is applied as input to a standard compiler 1380 such as the GCC or Intel compiler 1380. This compiler 1380 includes the requisite support for generating an executable program 1395 that provides for multiple threads of processing within the executable code, achieving the goal to improve performance of the program over the performance that which would be achieved without parallelism (or without multiple threads of processing). The various files of the overall compilation process are stored on a file storage device(s) such as a disk drive 1394, which are accessed typically through a CPU I/O System 1392. The overall computer system which includes memory, the I/O system, file storage space and other hardware can then be used to "run" or execute the resulting executable program. The executable program could also be moved to another computer system for execution or processing. In order to gain significant benefit in performance, CPU hardware which includes multiple cores 1396 is best suited in performing the processing, although improvement with multiple threads might even be possible running on a machine having a single processing unit.

FIG. 14 illustrates processing a Cobol Source Program 1310 in another illustrated system embodiment consistent with the teachings of the present invention. A first compiler 1420, which is another form of a Special Compiler/translator program, translates the Cobol source program into a C/C++ Program 1430 (intermediate computer program in a second computer programming language). The translation is performed by compiler 1420 such that whenever possible, the Cobol program 1310 is translated so that parallelization directives can be applied to the intermediate computer program. That is, the components of the C/C++ program 1430 are expressed in a manner so that parallelization directives such as those specified by OpenMP can be applied. A User 1450 typically a programmer then Inserts Parallelization Directives 1460 (OpenMP pragmas for example) into the intermediate computer program which results in a C/C++ Program 1470 that includes regions for parallelization identified by pragmas.

The C/C++ program 1570, which includes the pragmas, is then presented as input to a standard compiler 1380 such as the GCC or Intel compiler 1380. This compiler 1380 includes the requisite support for generating an executable program 1395 that provides for multiple threads of processing within the executable code, achieving the goal of improving performance of the program over that which would be achieved without parallelism (or without using multiple threads of processing).

The various files of the overall compilation process are stored on a file storage device(s) such as a disk drive 1594, which are accessed typically through a CPU I/O System 1392. The overall computer system which includes memory, the I/O system, file storage space and other hardware can then be used to "run" or execute the executable program. The executable program could also be moved to another computer system for execution or processing. In order to gain significant benefit in performance, CPU hardware which includes multiple cores 1396 is best suited in performing the processing, although improvement with multiple threads might even be possible when run on a machine having a single processing unit.

FIG. 15 illustrates, in an exemplary flow chart illustrating a further system embodiment for implementing the teachings of the present invention, in which a user 1550 defines regions for parallelization by inserting parallelization directives 1560 into an original Cobol Source Program code 1310 and in which the system then generates a C program by a first special compiler 1520 which creates C code 1570 in a form suitable for parallelization and including parallelization directives which are suitable for generating a multi-threaded executable by a second compiler 1380.

Considering FIG. 15 in greater detail, it is seen that a Cobol Source Program 1310 is annotated by a user 1550, typically a programmer, to form an Annotated Cobol Source Program 1530. The Annotated Cobol Source Program 1530 includes both the original Cobol Source Program code 1310, and designations of potential regions for parallelization within the Cobol program 1560. This Annotated Cobol Source Program 1530 is then translated by a special first compiler 1520, which is another form of a special compiler/translator program, into a C/C++ program 1570 (intermediate computer program in a second computer programming language). The translation is performed so that in whatever regions identified as a potential region for parallelization, the annotated Cobol program 1530 is translated so that parallelization directives can be applied to at least those related regions of the intermediate computer program. If analysis by the translator program 1520 determined that this was not possible, an error message could be issued by the translator program as described above.

Then, in the same manner as described in connection with FIGS. 13 and 14, the intermediate C/C++ program 1570 including the defined regions for parallelization is run through the Intel or GCC C/C++ Compiler 1380 producing a multithreaded 1595 program for execution on the computer system that includes a CPU I/O System 1392, multiple cores for processing 1396 and the appropriate files stored on a disk subsystem 1594.

The techniques described above for providing improvements in parallelization, and other techniques, which may be defined by those skilled in the art, are not necessarily all that is required to achieve any parallelization, but by combining a plurality of techniques according to the teachings of the present invention improves the likeliness of success, that is, the goal of achieving higher performance.

As a further example of the above, the ordering of the program statements in the second language is also important. Compilers oftentimes "move" or change the order of generated code to provide for efficiencies in execution or other reasons. When contemplating parallelization, it is important that the generated code in the second language be divided and ordered in a predictable way so that the second compiler can apply parallelization without destroying or affecting the overall functionality of the program. Some optimization can be done by the first compiler, but overall program flow between Cobol "paragraphs" is best maintained for success in parallelization. That is, statements can be combined or re-ordered when it makes no difference in the resulting functionality relative to any entry points into a procedure, but re-ordering should not be done across boundaries in the program which are subject to change when parallelization is being considered or implemented.

Describing parallelization in a manner that makes the description available to the second compiler also requires special techniques. In the prior art, parallelization is often described to a compiler using what are called "pragmas" as previously indicated. Pragmas are "comments" that are optionally interpreted by the compiler which may describe constructs and information not generally provided in the standard computer language. The OpenMP language is based upon the use of pragmas, these pragmas providing for "normal" single thread compilation if the pragmas are ignored, and providing for parallelism or multi-thread operation in the executable when they are considered by the compiler. Some compilers may choose to ignore some pragmas while providing support for other pragmas.

In providing a two stage approach which supports parallelization according to the teachings of the present invention, an improvement results by providing for processing of the pragmas in the source files of the first language (Cobol) as they are being translated into the second language. First, provision must be made for passing any comments at all from the source files of the Cobol program to the intermediate form. Normally (or typically) comments are ignored by translation programs. That is, comments are simply discarded meaning they are left completely out of the translated code, or they might be maintained in basically the same form as in the original source files. For parallelization to be successful, it is an improvement to provide at least some recognition and processing of comments in the original Cobol source, especially those which can be recognized as being related to parallelization or those which are actual parallelization "pragmas".

For example, pragmas may reference variable names, the variable names possibly being altered as the translation is made from the first language to the second language. In the prior art, pragmas which are typically "just" comments, might be ignored, discarded, or left in original form. Providing improved support for parallelization however suggests that any variable names in the pragmas be translated into variable names in the second language in the same manner as variable names are translated in the normal source of the program. In other words, it is an improvement to have the first compiler actually "translate" comment statements (pragmas) in the same manner that the normal program statements are translated.

It is also a further improvement to maintain the order of comments, especially those comments recognized as relating to parallelization, relative to the normal Cobol source statements. That is, for example, it is beneficial to maintain a comment statement that describes the next line of the Cobol program as being a parallelizable construct such as a potential "FOR" loop (in the C language) in the same relative location as in the translated intermediate fowl in order to provide that parallelization description properly to the second compiler.

Figure 16:
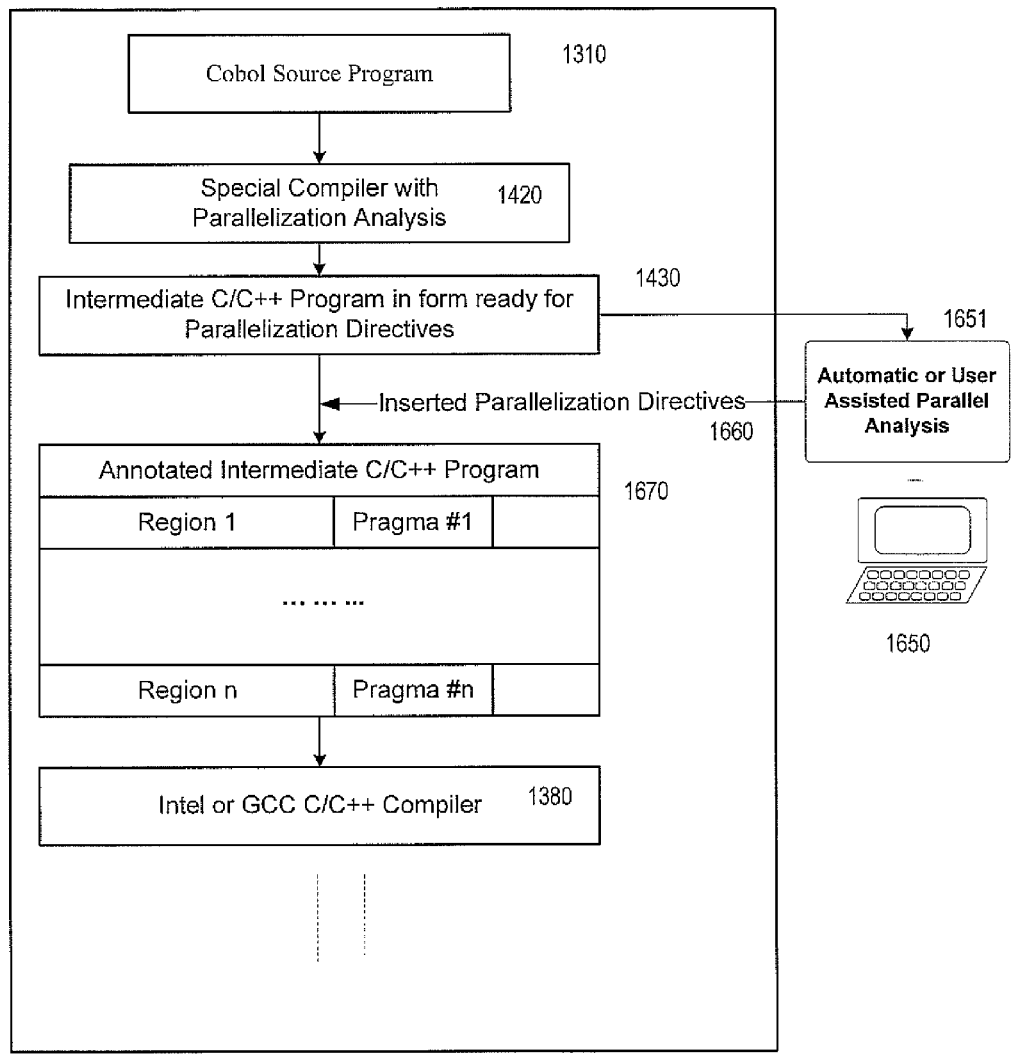

FIG. 16 is a Figure similar to that of FIG. 14. In this FIG. 16 an exemplary flow chart is presented illustrating a further system embodiment for implementing the teachings of the present invention. In the flow of this system implementation, the intermediate C/C++ program is analyzed by a parallel analysis program 1651 such as "FasThread" (available from Nema Labs as discussed in the Background of the Invention). Thus, the system implementation makes available to a user 1650 or programmer, a program or tool 165 lwhich can be used to assist the user 1650 in determining where to insert parallelization directives 1660, and/or what type of parallelization directives 1660 to insert. The user may assist the tool, or if the tool is good enough, or the program simple enough, the tool may be used in achieving full automation of the parallelization annotation. In the system implementation of FIG. 16, the user and tool together modify the Intermediate Program 1430 until the tool 1651 determines parallelization is achievable and when this process is complete, an Annotated Intermediate Program 1670 is produced that has good potential for successful parallelization.

Thus, while the principles of the invention have now been made clear and described relative to a number of illustrative embodiments or implementations, it will be immediately obvious to those skilled in the art the many modifications or adaptations which can be made without departing from those principles. While the invention has been shown and described with reference to specific illustrated embodiments, it should be understood by those skilled in the art that various changes in form and detail may be made such implementations without departing from the spirit and scope of the invention as defined by the following claims.

Having described the preferred embodiments of the invention, it will now become apparent to one of skill in the arts that other embodiments or implementations incorporating the teachings of the present invention may be used. Accordingly, these embodiments should not be limited to the disclosed embodiments or implementations but rather should be limited only by the spirit and scope of the following claims.

What is claimed is:

1. A method for generating, on a computer system, a multi-threaded program executable from an original annotated source program stored as a single file or module in storage of the computer system, the original annotated source program written primarily in Cobol programming language which is a high level programming language, the method comprising the steps:

A) reading from the storage of the computer system the original annotated source program stored as a single file or module and performing a first compiling operation, by a special Cobol translator/compiler, the original annotated source program including both
  a) original Cobol program statements, and,
  b) original parallelization directives, each original parallelization directive being related to a specific one or more of the original Cobol program statements, is the special Cobol translator/compiler generating as output, an intermediate directly related high level language computer program in a second high level computer programming language other than Cobol and, as part of the compiling operation, the special Cobol translator/compiler translating both the original Cobol program statements and original parallelization directives into translated intermediate program statements and translated intermediate parallelization directives respectively in the same second high level computer programming language, and both the translated statements and directives being arranged in the output directly related intermediate computer program in an order directly related to that as existing between:
  a) the original Cobol program statements included within the original annotated source program, and,
  b) the original parallelization directives included within the original annotated source program; and, B) performing a second compiling operation by a selected standard second high level language compiler on the intermediate directly related high level language computer program produced in step A, the selected second high level language compiler including functionally that provides support for:
  a) compiling of programming statements in the second high level computer programming language, and further including support for
  b) application, during the compiling, of parallelization directives mixed with the programming statements, and, C) generating the multi-threaded program executable as output from the second compiling operation of step B.

2. The method of claim 1 wherein the compiling of the intermediate directly related high level language computer program in Step B further includes the substeps of:

a) associating each original parallelization directive with one or more of the original Cobol source program statements;

b) generating any intermediate program statements related to original Cobol source program statements associated with any of the original parallelization directives in a form that enables application of the intermediate parallelization directives to these intermediate program statements; and, c) generating each intermediate parallelization directive in a form for describing parallelization, within programs in the second computer programming language, as provided for by the selected second high level language compiler.

3. The method of claim 1 wherein the intermediate parallelization directives generated in Step A are pragmas supported by the selected second high level language compiler.

4. The method of claim 1 wherein step B further includes the step of translating original Cobol variable declaration statements which include original Cobol variables with original Cobol variable names, from within the original annotated source program, into intermediate variable declaration statements, each intermediate variable declaration statement declaring and describing in the second high level computer programming language one or more intermediate program variables designated by intermediate variable names and types, each intermediate variable name being predictably generated based upon the original Cobol variable names, and including these intermediate variable declaration statements in the generated intermediate directly related high level language computer program.

5. The method of claim 4 wherein the intermediate variable names generated by the first compiling are names directly and predictably related to the original Cobol variable names in the original annotated source program.

6. The method of claim 5 wherein the generation of the translated intermediate parallelization directives further includes predictably translating any variable names referenced within any of the original parallelization directives in precisely the same manner as the original Cobol variable names are predictably translated in generating the intermediate variable declaration statements.

7. The method of claim 1 wherein the compiling of the intermediate directly related high level language computer program by the selected second compiler is further controlled by the computer system such that the multi-threaded program executable includes within the executable information that enables debugging and analysis of the executable using variable names directly and predictably related to the original Cobol variable names.

8. The method of claim 1 wherein the reading and compiling of step A further includes a step of providing standard code optimization, but with scope of the standard code optimization restricted so as to prevent optimization associated with multiple Cobol program statements, so as to avoid optimization that would span more than one described region for parallelization defined in the annotated original source program.

9. The method of claim 1 second high level computer programming language is selected from the set of C, C++, and Java.

10. A system for generating a multi-threaded program executable from an original annotated source program, the original annotated source program written primarily in Cobol programming language, a high level programming language, the system comprising:
  A) storage apparatus accessible by a computer system for storing the original annotated source program, an intermediate directly related high level language computer program, and the generated multi-threaded program executable;
  B) a first control program controlling the computer system to perform a reading and a first compiling operation utilizing a special Cobol translator/compiler the original annotated source program being read from the storage of the computer system,
  the original annotated source program including both
    a) original Cobol program statements, and,
    b) original parallelization directives, each original parallelization directive relating to a specific one or more of the original Cobol program statements,
  the special Cobol translator/compiler generating as output the intermediate directly related high level language computer program in a second high level computer programming language other than Cobol and storing that intermediate directly related high level language computer program into the storage apparatus, and,
  as part of the compiling, the special Cobol translator/compiler translating the original Cobol program statements into translated intermediate program statements in the second high level computer programming language,
  and further translating the original parallelization directives to translated intermediate parallelization directives in the same second high level computer programming language,
  the a) translated intermediate program statements, and, the b) translated intermediate parallelization directives, together arranged in the output directly related intermediate computer program in a manner that is directly related to the relationship existing between the corresponding:
    a) original Cobol program statements within the original annotated source program, and,
    b) original parallelization directives within the original annotated source program; and,
  C) a second control program control program controlling the computer system to perform a reading and a second compiling operation using a selected second high level language compiler,
  the selected second high level language compiler including support for:
    a) compiling of programming statements in the second high level computer programming language, and further including support for
    b) application during the compiling of parallelization directives mixed with these programming statements in a single input source file or module,
  the selected second high level language compiler using as input for compiling, as input source code, the intermediate directly related high level language computer program generated in step A;
  and,
  generating and storing, into the storage apparatus, the multi-threaded program executable as output from the compiling a second time by the selected second high level language compiler.

11. A program product comprising a non-transitory computer readable storage medium storing instructions for generating, on a computer system, a multi-threaded program executable from an original annotated source program stored as a single input source code file or module in storage of the computer system, the original annotated source program written primarily in Cobol programming language, a high level programming language, the program product including instructions for performing the method comprising the steps of:
  A) reading the original annotated source program contained in the single input source code file or module from the storage of the computer system by a special Cobol translator/compiler,
  the original annotated source program including both
    a) original Cobol program statements, and,
    b) original parallelization directives, each original parallelization directive relating to a specific one or more of the original Cobol program statements,
  B) compiling the original annotated source program and generating as output, an intermediate directly related high level language computer program in a second high level computer programming language other than Cobol, and,
  during the compiling, the special Cobol translator/compiler translating the original Cobol program statements and the original parallelization directives into translated intermediate program statements and translated intermediate parallelization directives respectively in the second high level computer programming language, the translated intermediate program statements, and, translated intermediate parallelization directives being arranged together in the output directly related intermediate computer program in a manner directly related to the relationship existing between the corresponding:
original Cobol program statements within the original annotated source program, and,
original parallelization directives within the original annotated source program, and
the intermediate directly related high level language computer program produced in step B being structured so as to be ready for compilation by a selected standard high level language compiler,
the selected standard high level language compiler being capable of providing support for both a) compiling of programming statements in the second high level computer programming language, and b) application, during the compiling, of the parallelization directives mixed with the programming statements in the single input source file or module, during compiling for generating the multi-threaded program executable.

* * * * *